United States Patent
Wie et al.

(10) Patent No.: US 7,769,806 B2
(45) Date of Patent: Aug. 3, 2010

(54) AUTOMATED REAL-TIME DATA STREAM SWITCHING IN A SHARED VIRTUAL AREA COMMUNICATION ENVIRONMENT

(75) Inventors: David Van Wie, Eugene, OR (US); Paul J. Brody, Palo Alto, CA (US)

(73) Assignee: Social Communications Company, Eugene, OR (US)

( * ) Notice: Subject to any disclaimer, the term of this patent is extended or adjusted under 35 U.S.C. 154(b) by 342 days.

(21) Appl. No.: 11/923,629

(22) Filed: Oct. 24, 2007

(65) Prior Publication Data
US 2009/0113066 A1    Apr. 30, 2009

(51) Int. Cl.
G06F 15/16    (2006.01)
(52) U.S. Cl. .................. 709/203; 709/231; 709/200
(58) Field of Classification Search ............... 709/200, 709/203, 231
See application file for complete search history.

(56) References Cited

U.S. PATENT DOCUMENTS

| | | | |
|---|---|---|---|
| 5,414,801 A | 5/1995 | Smith et al. | |
| 5,889,843 A | 3/1999 | Singer et al. | |
| 5,949,866 A * | 9/1999 | Coiera et al. | 379/211.02 |
| 5,999,208 A | 12/1999 | McNerney et al. | |
| 6,014,145 A | 1/2000 | Bardon et al. | |
| 6,119,147 A | 9/2000 | Toomey et al. | |
| 6,275,493 B1 | 8/2001 | Morris | |
| 6,362,817 B1 | 3/2002 | Powers et al. | |
| 6,370,565 B1 | 4/2002 | Van Gong | |
| 6,396,837 B1 | 5/2002 | Wang | |
| 6,421,047 B1 | 7/2002 | DeGroot | |
| 6,728,356 B1 | 4/2004 | Carroll | |
| 6,763,371 B1 | 7/2004 | Jandel | |
| 2001/0046228 A1 | 11/2001 | Tahtinen | |

(Continued)

FOREIGN PATENT DOCUMENTS

JP    10-75307    3/1998

(Continued)

OTHER PUBLICATIONS

Search report and written opinion in PCT/US2008/080219, mailed Mar. 31, 2009.

(Continued)

*Primary Examiner*—Salad Abdullahi
*Assistant Examiner*—El Hadji M Sall
(74) *Attorney, Agent, or Firm*—Edouard Garcia

(57) ABSTRACT

Switching real-time data stream connections between network nodes sharing a virtual area is described. In one aspect, the switching involves storing a virtual area specification. The virtual area specification includes a description of one or more switching rules each defining a respective connection between sources of a respective real-time data stream type and sinks of the real-time data stream type in terms of positions in the virtual area. Real-time data stream connections are established between network nodes associated with respective objects each of which is associated with at least one of a source and a sink of one or more of the real-time data stream types. The real-time data stream connections are established based on the one or more switching rules, the respective sources and sinks associated with the objects, and respective positions of the objects in the virtual area.

42 Claims, 17 Drawing Sheets

U.S. PATENT DOCUMENTS

| | | |
|---|---|---|
| 2002/0013813 A1 | 1/2002 | Matsuoka |
| 2003/0052911 A1 | 3/2003 | Cohen-soloal |
| 2004/0030797 A1* | 2/2004 | Akinlar et al. ............. 709/232 |
| 2004/0128350 A1 | 7/2004 | Topfl et al. |
| 2006/0077205 A1 | 4/2006 | Guymon, III et al. |
| 2006/0227785 A1 | 10/2006 | Cournut et al. |
| 2006/0242235 A1 | 10/2006 | Classen et al. |
| 2006/0244818 A1 | 11/2006 | Majors et al. |
| 2007/0038701 A1 | 2/2007 | Majors et al. |
| 2007/0050716 A1 | 3/2007 | Leahy et al. |
| 2007/0097885 A1 | 5/2007 | Traversat et al. |
| 2007/0133436 A1 | 6/2007 | Provino et al. |
| 2007/0177529 A1 | 8/2007 | Provino et al. |
| 2007/0299778 A1* | 12/2007 | Haveson et al. ............. 705/51 |

FOREIGN PATENT DOCUMENTS

| | | |
|---|---|---|
| WO | WO 01/91868 | 12/2001 |
| WO | 02011327 | 7/2002 |
| WO | WO 03/058518 | 7/2003 |
| WO | WO 03/091894 | 11/2003 |
| WO | 2004036458 | 4/2004 |
| WO | WO 2005/015880 | 2/2005 |
| WO | WO 02/37784 | 5/2007 |

OTHER PUBLICATIONS

Search report and written opinion in PCT/US2008/080226, mailed May 27, 2009.

Chris Greenhalgh et al., "MASSIVE: a collaborative virtual environment for teleconferencing," ACM Transactions on Computer-Human Interaction (TOCHI), vol. 2, Issue 3, pp. 239-261 (Sep. 1995).

Flavio Paiva Junqueira et al., "Multicast Communication for Distributed Virtual Environments based on Active Networks," Grupo de Teleinformatica e Automacao—GTA Universidade Federal do Rio de Janeiro (2001).

Nakanishi, H. et al., "FreeWalk: a 3D virtual space for casual meetings," Multimedia, IEEE, vol. 6, Issue 2, pp. 20-28 (Apr.-Jun. 1999).

Chris Greenhalgh, "Dynamic, embodied multicast groups in MASSIVE-2," The University of Nottingham, Department of Computer Science, Technical Report NOTTCS-TR-96-8, pp. 1-14 (1996).

Steve Benford et al., "Crowded collaborative virtual environments," Conference on Human Factors in Computing Systems, Proceedings of the SIGCHI conference on Human factors in computing systems, Atlanta, Georgia, United States, pp. 59-66 (1997).

Maja Matijasevic, "A review of networked multi-user virtual environments," Tech. Rep. TR97-8-1, Center for Advanced Computer Studies, Virtual Reality and Multimedia Laboratory, University of Southwestern Lousiana, USA (1997).

* cited by examiner

AUTOMATED REAL-TIME DATA STREAM SWITCHING IN A SHARED VIRTUAL AREA COMMUNICATION ENVIRONMENT

BACKGROUND

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients that are interconnected by an instant message server. Some instant messaging systems additionally allow users to be represented in a virtual environment by user-controllable graphic objects (referred to as "avatars"). Interactive virtual reality communication systems enable users in remote locations to communicate over multiple real-time channels and to interact with each other by manipulating their respective avatars in a shared three-dimensional virtual space.

Interest in avatar-based virtual reality communications systems has grown with the increased availability of computing systems that have high-processing-power and high-bandwidth network connections. A primary goal of such a virtual reality system is to create a virtual space in which users can interact and communicate using real-time data streams, such as audio, video and text chat streams. The virtual space typically is defined by a computer graphics specification that describes the visual geometry of the space, the colors and textures that are mapped onto the visual geometry, the collision properties that control how users maneuver within the space, and auditory properties, such as, reverberation and sound absorption properties, of the space.

In a typical virtual reality system, each of the users communicates through an interface that is a source, a sink, or both a source and a sink of one or more of the real-time data streams that are supported by the system. By default, the virtual reality system typically connects each source represented in the virtual space to every sink represented in the virtual space, subject to conditions specified in global switching rules, local user preferences, and the properties of objects within the virtual space. These conditions typically are specified in terms of relative distances between objects. For example, some systems are configured so that real-time data stream connections are not established if the separation distance between avatars exceeds a maximum threshold distance. In addition, some objects have been designed to affect how data streams are rendered. For example, a screen object obstructs views and sounds from a particular direction. Other objects are designed to affect the areas of interaction that are associated with a user's avatar when the user's avatar is within the interaction areas of these objects. For example, a podium adapter object increases the size of the audio interaction space of avatars within the interaction space of a virtual podium, and a table adapter object folds the interaction spaces of all of the avatars seated at a virtual table into a common interaction space that spans the virtual table.

SUMMARY

In one aspect, the invention features a method of switching real-time data stream connections between network nodes sharing a virtual area. In accordance with this method, a virtual area specification is stored. The virtual area specification includes a description of one or more switching rules each defining a respective connection between sources of a respective real-time data stream type and sinks of the real-time data stream type in terms of positions in the virtual area. One or more real-time data stream connections are established between network nodes associated with respective objects each of which is associated with at least one of a source and a sink of one or more of the real-time data stream types. The real-time data stream connections are established based on the one or more switching rules, the respective sources and sinks associated with the objects, and respective positions of the objects in the virtual area.

The invention also features apparatus operable to implement the method described above and computer-readable media storing computer-readable instructions causing a computer to implement the method described above.

In another aspect, the invention features a computer-implemented method of constructing a virtual area. In response to user input, a model of the virtual area is created in a display monitor. The model includes geometric elements of the virtual area that are presented in the display monitor. In response to user input, one or more switching rules are associated with the model of the virtual area. Each of the switching rules defines a respective connection between sources of a respective real-time data stream type and sinks of the real-time data stream type in terms of positions in the virtual area. A virtual area specification that describes the model of the virtual area and the one or more associated switching rules is generated. The virtual area specification is stored in a computer-readable storage medium.

In another aspect, the invention features a network switch for switching real-time data stream connections between network nodes sharing a virtual area. The network switch includes a computer readable memory and a processing unit. The computer readable memory is operable to store a virtual area specification that includes a description of one or more switching rules each defining a respective connection between sources of a respective real-time data stream type and sinks of the real-time data stream type in terms of positions in the virtual area. The computer readable memory also is operable to store a table that includes network topology information describing routes to network destinations. The processing unit is operable to forward real-time data stream packets between network nodes each of which is associated with a respective position in the virtual area and at least one of a source and a sink of one or more of the real-time data stream types. The processing unit forwards the one or more real-time data stream packets based on the network topology information and the one or more switching rules.

Other features and advantages of the invention will become apparent from the following description, including the drawings and the claims.

DETAILED DESCRIPTION

Figure 1:
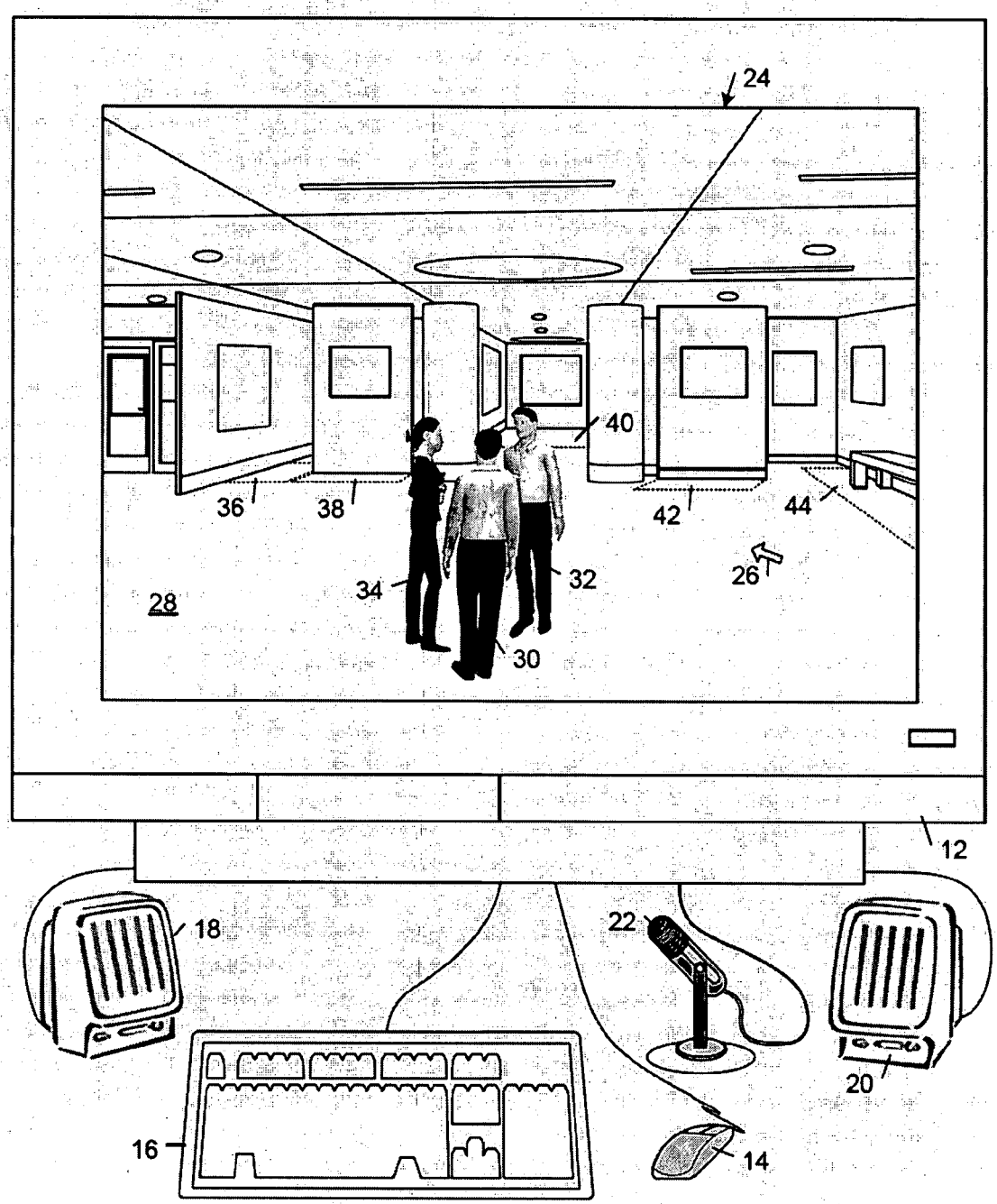
FIG. 1 is a diagrammatic view of an embodiment of a network node that includes a graphical user interface presenting a two-dimensional depiction of a shared virtual area.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

The embodiments that are described herein provide systems and methods of switching real-time data stream connections in a shared virtual area communication environment. These embodiments enable switching rules for connecting real-time data streams between network nodes communicating through a shared virtual area to be tied explicitly to the specification of the virtual area.

These embodiments allow a designer of the virtual area to control not only the shape and appearance of the virtual area, but also the way in which communicants connect to one another through real-time data streams. In this way, the area designer is able to optimize the real-time data stream connections that are made between communicants sharing a virtual area for a particular communication purpose or for a particular communication environment (e.g., personal space, art gallery, concert hall, auditorium, conference room, and club house).

In addition, by tying automatic switching rules to locations in the virtual area, these embodiments reduce the complexity involved in connecting and disconnecting communicant nodes and increases the scalability of the system as compared to systems that establish and terminate connections based on attributes and properties of objects within a virtual space and systems that intertwine signal processing functions with stream routing, connection and disconnection functions.

II. Definitions of Terms

A "virtual area" is a representation of a computer-managed space or scene. Virtual areas may be two-dimensional or three-dimensional representations. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules.

A "virtual area specification" is a virtual area description that is used in creating a shared virtual area communication environment.

A "zone" is a region of a virtual area that is associated with at least one rule for switching (e.g., routing, connecting and disconnecting) real-time data streams between network nodes communicating through a shared virtual area.

A "communicant" is a person who communicates or otherwise participates in a shared virtual area communication session.

An "object" is any type of discrete element in a virtual area that is separate from the geometry of the virtual area. An object typically has attributes or properties that are separate and distinct from the attributes and properties of the virtual area.

An "avatar" is an object that represents a communicant in a virtual area.

A "position" in a virtual area refers to a location of a point or an area or a volume in the virtual area. A point typically is represented by a single set of two-dimensional or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "network node" is a junction or connection point in a communications network. Exemplary network nodes include, but not limited to, a terminal, a computer, and a network switch.

A "computer" is a machine that processes data according to machine-readable instructions (e.g., software) that are stored on a machine-readable medium either temporarily or permanently. A set of such instructions that performs a particular task is referred to as a program or software program.

A "real-time data stream" is data that is structured and processed in a continuous flow and is designed to be received with no delay or only imperceptible delay; real-time data streams include digital representations of voice, video, user movements, facial expressions and other physical phenomena as well as data within the computing environment that may benefit from rapid transmission, rapid execution, or both rapid transmission and rapid execution, including for example, avatar movement instructions, text chat, real-time data feeds (e.g., sensor data, machine control instructions, transaction streams and stock quote information feeds), and file transfers.

A "data source" (referred to herein simply as a "source") is any of a device, part of a device (e.g., a computer), or software that originates data.

A "data sink" (referred to herein simply as a "sink") is any of a device, part of a device (e.g., a computer), or software that receives data.

A "switching rule" is an instruction that specifies one or more conditions that must be satisfied in order to connect or disconnect one or more real-time data sources and one or more real-time data sinks.

A "stream mix" is a combination of two or more real-time data streams of the same type (e.g., audio, video, chat, and motion data).

A "transceiver switch" is a network device that cross-connects network nodes (e.g., clients, servers and network devices) by receiving analog or digital signals from a network node and transmitting the received signals (or copies of the received signals) to one or more other network nodes.

A "stream handling topology" is the organization of network routes over which real-time data streams (each of which may be a mixed stream or an unmixed stream) are delivered to one or more network nodes.

III. Introduction

The embodiments that are described herein provide systems and methods of switching real-time data streams in a shared virtual area communication environment. Communicants typically access such an environment from respective network nodes that execute respective copies of a communications software program with two-dimensional and three-dimensional visualization capabilities. The communications software program controls client processes that present a respective view of the virtual area at a respective network node and establishes real-time data stream connections with other network nodes. The communicants typically are represented in the virtual area by respective avatars, which move about the virtual area in response to input commands that are input by the communicants at their respective network nodes. The communicant's view of the virtual area typically is presented from the perspective of the communicant's avatar, which increases the level of immersion experienced by the communicant. Each communicant typically is able to view any part of the virtual area around his or her avatar.

FIG. 1 shows an embodiment of a network node 10 that is implemented by a computer system that includes a display monitor 12, a computer mouse 14, a keyboard 16, speakers 18, 20, and a microphone 22. The display monitor 12 displays a graphical user interface 24. The graphical user interface 24 is a windows-based graphical user interface that can include multiple windows, icons, and a pointer 26. In the illustrated embodiment, the graphical user interface 24 presents a two-dimensional depiction of a shared three-dimensional virtual area 28 representing an art gallery. Communicants are represented in the virtual area 28 by respective avatars 30, 32, 34, each of which may have a respective role (e.g., a curator, an artist, and a visitor).

As explained in detail below, the virtual area 28 includes zones 36, 38, 40, 42, 44 that are associated with respective rules governing switching of real-time data streams between the network nodes that are represented by the avatars 30-34 in the virtual area 28. (During a typical communication session, the dashed lines demarcating the zones 36-44 in FIG. 1 are not visible to the communicants although there may be visual cues associated with such zone boundaries.) The switching rules dictate how local connection processes executing on each of the network nodes establishes communications with the other network nodes based on the locations of the communicants' avatars 30-34 in the zones 36-44 of the virtual area 28.

During a communication session, each of the communicant network nodes generates a respective set of real-time data streams (e.g., motion data streams, audio data streams, chat data streams, file transfer data streams, and video data streams). For example, each communicant manipulates one or more input devices (e.g., the computer mouse 14 and the keyboard 16) that generate motion data streams, which control the movement of his or her avatar in the virtual area 28. In addition, the communicant's voice and other sounds that are generated locally in the vicinity of the network node 10 are captured by the microphone 22. The microphone 22 generates audio signals that are converted into a real-time audio stream. Respective copies of the audio stream are transmitted to the other network nodes that are represented by avatars in the virtual area 28. The sounds generated locally at these other network nodes are converted into real-time audio signals and transmitted to the network node 10. The network node 10 converts the received locally generated audio streams into audio signals that are rendered by the speakers 18, 20. The motion data streams and audio streams may be transmitted from each of the communicant nodes to the other communicant network nodes either directly or indirectly. In some stream handling topologies, each of the communicant network nodes receives copies of the real-time data streams that are transmitted by the other communicant network nodes. In other stream handling topologies, one or more of the communicant network nodes receives one or more stream mixes that are derived from real-time data streams that are sourced (or originated) from other ones of the network nodes.

Figure 2A:
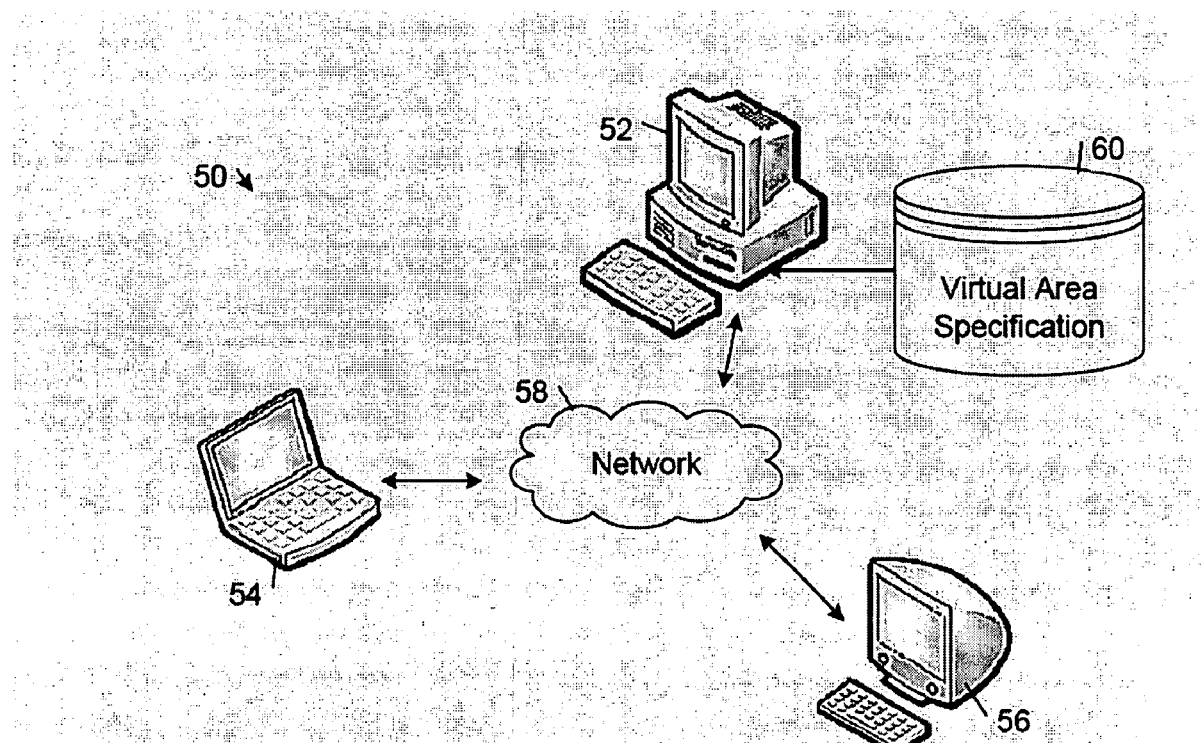
FIG. 2A is diagrammatic view of an embodiment of a shared virtual area communication environment in which network nodes communicate in a peer-to-peer architecture.

FIG. 2A is diagrammatic view of an embodiment of a shared virtual area communication environment 50 in which three network nodes 52, 54, 56 are interconnected by a communications network 58 in a peer-to-peer architecture. The communications network 58 may be a local area network (LAN) or a global communication network (e.g., the Internet). The network nodes 52-56 are represented by respective computers.

In this architecture, each of the network nodes 52-56 transmits state changes, such as avatar movements in the virtual area, to each of the other network nodes. One of the network nodes (typically the network node that initiates a communication session) operates as an area server. In the illustrated embodiment, the network node 52 has assumed the role of the area server. The area server network node 52 maintains global state information and serves as a data server for the other network nodes 54, 56. The global state information includes a list of all of the objects that are in the virtual area and their respective locations in the virtual area. The area server network node 52 periodically sends the global state information to the other network nodes 54, 56. The area server network node 52 also registers and transmits initialization information to other network nodes that request to join the communication session. In this process, the area server network node 52 transmits to each joining network node a copy of a virtual area specification 60, which may be stored in a local or remote database. The area server network node 52 also ensures that other network nodes 54, 56 can synchronize to a global state if a communications fault occurs.

As explained in detail below, the virtual area specification 60 includes a description of geometric elements of the virtual area and one or more switching rules governing real-time stream connections between the network nodes. The description of the geometric elements allows respective communications applications operating on the network nodes 52-56 to present respective views of the virtual area to the communicants on respective display monitors. The switching rules dictate how connection processes executing on each of the network nodes 52-56 establish communications with the other network nodes based on the locations of the communicants' avatars in the virtual area.

Figure 2B:
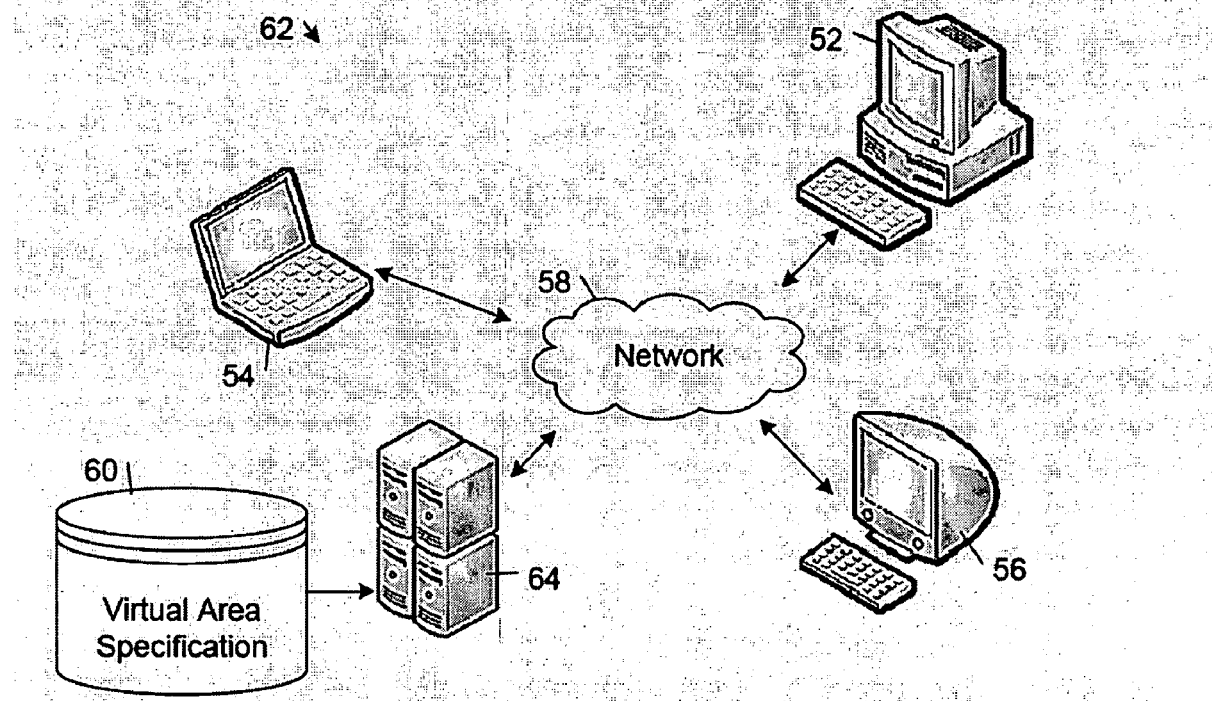
FIG. 2B is a diagrammatic view of an embodiment of a shared virtual area communication environment in which network nodes communicate in a server-mediated architecture.

FIG. 2B is a diagrammatic view of an embodiment of a shared virtual area communication environment 62 in which the network nodes 52-56 (referred to as "area client network nodes" in this architecture) communicate in an architecture that is mediated by an area server 64. In this embodiment, the area server 64 assumes the area server functions that were performed by the network node 52 in the peer-to-peer architecture embodiment shown in FIG. 2A. In this regard, the area server 64 maintains global state information and serves as a data server for the area client network nodes 52-56. As explained in detail below, this architecture allows the real-time data stream switching between the area client nodes 52-56 to be handled in a variety of topologies, including a peer-to-peer topology, a fully server-mediated topology in which the area server 64 operates as a communications broker between the network nodes 52-56, and a hybrid topology that combines aspects of the peer-to-peer topology and the fully server-mediated topology.

Figure 3:
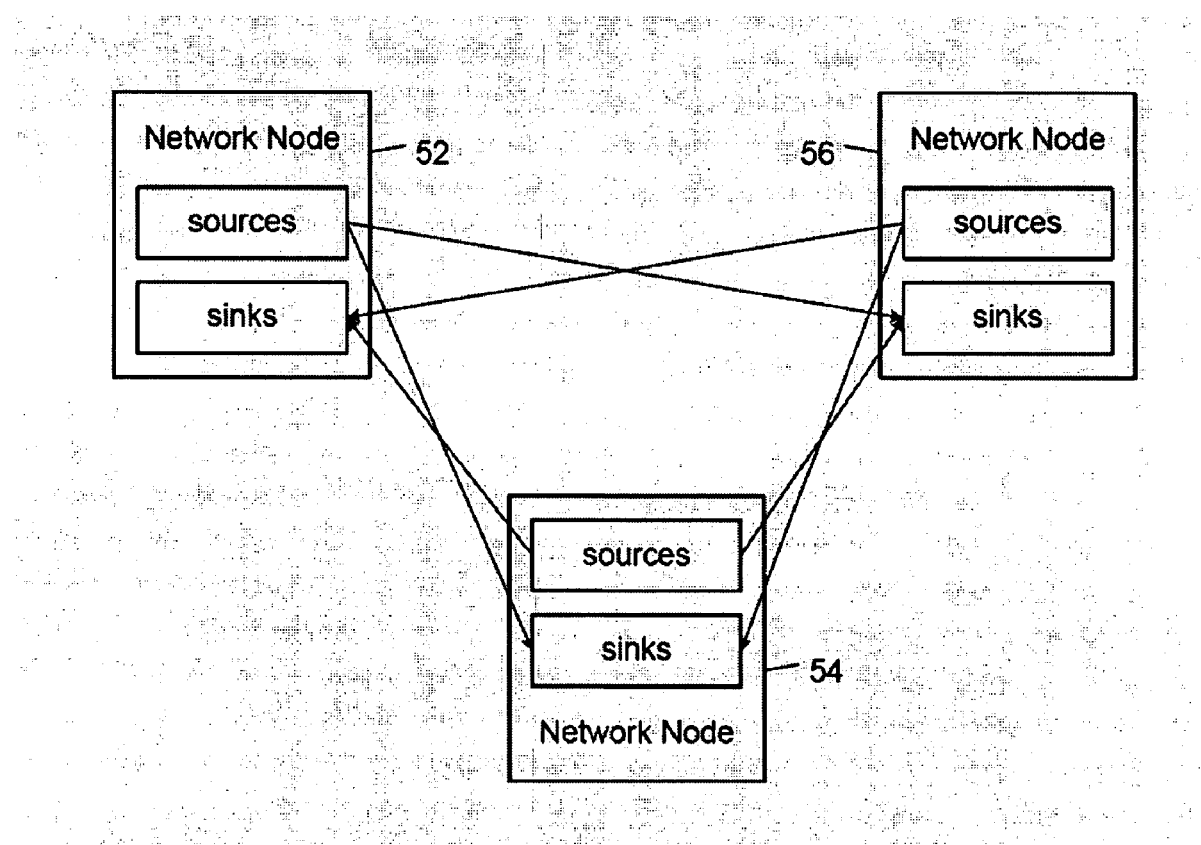
FIG. 3 is a block diagram of an embodiment of a shared virtual area communication environment that includes an exemplary set of real-time data stream connections between the sources and sinks of three network nodes.

FIG. 3 shows exemplary sets of real-time data stream connections between the sources and sinks of the three network nodes 52-56 in an embodiment of a shared virtual area communication environment. For ease of illustration, each of the arrows in FIG. 3 represents a respective set of one or more real-time data streams. In accordance with embodiments described herein, the connections shown in FIG. 3 are established based on the switching rules defined in the specification of the shared virtual area, the locations of the communicants' avatars in the shared virtual area, and the particular sources and sinks that are available on each of the network nodes 52-56.

Figure 4:
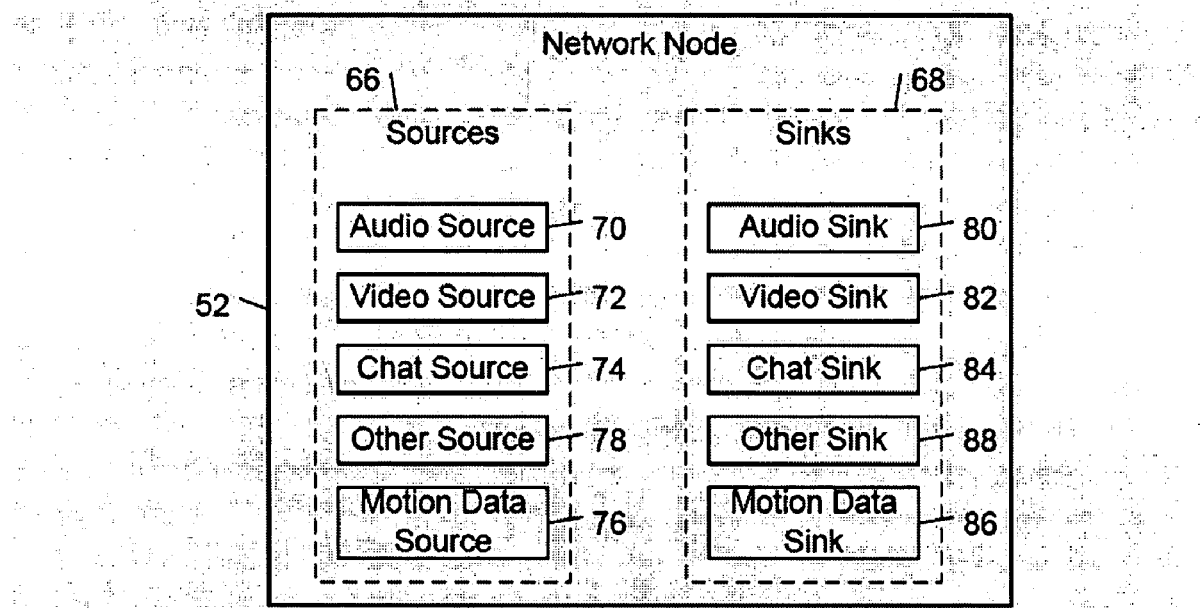
FIG. 4 shows a block diagram of an embodiment of a network node that includes an exemplary set of sources and an exemplary set of sinks.

FIG. 4 shows an exemplary embodiment of the network node 52 that includes an exemplary set 66 of sources and an exemplary set 68 of sinks. Each source is a device or component of the network node 52 that originates data and each sink is a device or component of the network node 52 that receives data. The set 66 of sources includes an audio source 70 (e.g., an audio capture device, such as a microphone), a video source 72 (e.g., a video capture device, such as a video camera), a chat source 74 (e.g., a text capture device, such as a keyboard), a motion data source 76 (e.g., a pointing device, such as a computer mouse), and an "other" source 78 (e.g., file sharing source or a source of a customized real-time data stream). The set 68 of sinks includes an audio sink 80 (e.g., an audio rendering device, such as a speaker or headphones), a video sink 82 (e.g., a video rendering device, such as a display monitor), a chat sink 84 (e.g., a text rendering device, such as a display monitor), a motion data sink 86 (e.g., a movement rendering device, such as a display monitor), and an "other" sink 88 (e.g., a printer for printing shared files, a device for rendering real-time data streams different from those already described, or software that processes real-time streams for analysis or customized display).

As exemplified by the network node embodiment shown in FIG. 4, each of the network nodes potentially has available a wide variety of sources and sinks. By enabling an area designer to control how the connections are established between the sources and sinks, the embodiments that are described herein provide the area designer with much control over the sensory experiences of the communicants as they communicate and otherwise interact in the virtual area. In this way, the area designer is able to optimize the virtual area for a particular communication purpose or for a particular communication environment (e.g., art gallery, concert hall, auditorium, conference room, and club house).

IV. Specifying a Virtual Area

A. Introduction

A shared virtual area is defined by a specification that includes a description of geometric elements of the virtual area and one or more switching rules governing real-time stream connections between the network nodes.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a designer.

The switching rules typically include a description of conditions for connecting sources and sinks of real-time data streams in terms of positions in the virtual area. Each rule typically includes attributes that define the real-time data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area.

B. Exemplary Ways of Specifying a Virtual Area

1. Specifying the Geometric Elements of the Virtual Area

A wide variety of different three-dimensional graphics design tools and game level design editors may be used to specify the geometric elements of a virtual area. In general, the specification of the geometric elements of a virtual area can be described in any type of three-dimensional description language including, but not limited to, VRML (see, e.g., http://www.web3d.org/x3d/specifications/vrml), X3D (see, e.g., http://www.web3d.org/x3d/specifications/x3d), COLLADA (see, e.g., http://www.COLLADA.org), and U3D (see, e.g., http://www.w3.org).

In some embodiments, the virtual area specification describes the geometric elements of the virtual area in accordance with COLLADA, which is an XML-based digital asset exchange schema that includes "tags" or "elements" (i.e., words bracketed by "<" and ">") and "attributes" (i.e., attribute name="value"). In some of these embodiments, the COLLADA description of the geometric elements of the virtual area is created using a three-dimensional graphics tool, such as SketchUp (available from Google Inc. of Mountain View, Calif. USA), Maya or 3ds Max (both available from Autodesk of San Rafael, Calif. USA).

2. Specifying the Switching Rules Associated with the Virtual Area a. Overview

In some embodiments, the virtual area specification describes the switching rules that are associated with the virtual area in accordance with the following XML-based extension of the COLLADA schema. The model presented below is described as a proposed extension to the COLLADA—Digital Asset Schema Release 1.4.1 April 2006 specification (available from http://www.khronos.org/collada/). This extension is referred to herein as the "COLLADA Streams Reference."

b. COLLADA Streams Reference

The switching rules that are defined in accordance with the COLLADA Streams Reference refer to sources and sinks, which typically are defined at the system level. In some embodiments, extensibility features of the XML system underlying COLLADA are used to describe application specific stream types. In other embodiments, the supported stream types are updated in the system. The COLLADA Streams Reference allows an area developer to define new stream types for a given area. In these cases, if a communicant's system encounters an unknown stream type when entering an area, the system activates a developer-specified method to update the system with necessary information to handle the stream type and to configure appropriate stream handling within the communicant's system.

Typically, there is a connection between a stream source type such as "voice," and the actual local stream source (e.g., a particular microphone) and any signal processing or other stream handling plug-ins that are associated with that source (e.g. a compressor/limiter or a motion data stream source that generates avatar movement based on voice). The type "voice" typically is defined by the system so that any area designer can use it, rather than requiring each designer to define that type on their own. Specifying particular plug-ins that are either preferred or required, on the other hand, are common parts of application design. The COLLADA Streams Reference enables communicants to assign a stream source type like voice to a microphone, a recording or a music source; as well as define plug-ins within a handler.

A similar situation affects sinks. Sinks for stream types like "voice" typically are established at the system level (e.g. a headset or speakers). There may be additional plug-ins specified by either the communicant or the area designer (e.g., distance-based fader levels and stereo pan based on relative location).

The elements of the COLLADA Streams Reference that describe zones and rules for connecting stream sources and sinks in terms of the zones are defined below.

i. <zone_mesh>

The <zone_mesh> tags define the boundaries of zones.

(1) Introduction

Contains or refers to information sufficient to describe basic geometric meshes.

(2) Concepts

The definition of <zone_mesh> is identical to <mesh> except that, instead of a complete description (<source>, <vertices>, <polygons>, and so on), it may simply point to another <geometry> to derive its shape. The latter case typically means that the convex hull of that <geometry> should be computed for use as a zone boundary (indicated by the optional convex_hull_of attribute).

This is very useful because it allows for reusing a <mesh> (e.g. one used for rendering) for stream handling to minimize the document size and to maintain a link to the original <mesh>. In this sense, a <zone_mesh> is analogous to the COLLADA <convex_mesh> element that is used for physics engines.

The required volume attribute indicates whether the zone is the interior or exterior of the mesh volume.

The minimal way to describe a <convex_mesh> is to specify its vertices (via a <vertices> element and its corresponding source) and let the importer compute the convex hull of that point cloud.

(3) Attributes

The <zone_mesh> element has the following attributes:

| volume | text | Indicates whether zone boundary is exterior or interior volume of the mesh. Required. |
|---|---|---|
| convex_hull_of | xs:anyURI | A URI string of a <geometry> to compute the convex hull of. Optional. |

(4) Related Elements

The <convex_mesh> element relates to the following elements:

| Occurrences | Number of elements defined in the schema |
|---|---|
| Parent elements | geometry |
| Child elements | See the following subsection. |
| Other | None |

(5) Child Elements

Child elements must appear in the following order if present: <source>, <vertices>, primitive elements, <extra> (where primitive elements is any combination of <lines>, <linestrips>, <polygons>, <polylist>, <triangles>, <trifans>, or <tristrips>).

| Name/example | Description | Default | Occurrences |
|---|---|---|---|
| < source > | Provides the bulk of the mesh's vertex data. | | 1 or more |
| < vertices > | Describes the mesh-vertex attributes and establishes their topological identity. | | 1 |
| < lines > | Contains line primitives. | | 0 or more |
| < linestrips > | Contains line-strip primitives. | | 0 or more |
| < polygons > | Contains polygon primitives which may contain holes. | | 0 or more |
| < polylist > | Contains polygon primitives that cannot contain holes. | | 0 or more |
| < triangles > | Contains triangle primitives. | | 0 or more |
| < trifans > | Contains triangle-fan primitives. | | 0 or more |
| < tristrips > | Contains triangle-strip primitives. | | 0 or more |
| < extra > | | | 0 or more |

(6) Example

Here is an example of a basic <zone_mesh> element.

```
< geometry id = "myZoneMesh" >
    < zone_mesh volume = "interior" >
        < source > ... < /source >
        < vertices > ... < /vertices >
        < polygons > ... < /polygons >
    < /zone_mesh >
< /geometry >
```

Here is another example of a <zone_mesh> element.

```
< geometry id = "myArbitraryMesh" >
    < mesh >
    ...
    < /mesh >
< /geometry >
< geometry id = "myZoneMesh" >
    < zone_mesh volume = "exterior"
        convex_hull_of = "#myArbitraryMesh"/ >
< /geometry >
``` ii. <stream>

The <stream> tags define switching rules within <zone>.
The <stream> element has the following attributes:

| | |
|---|---|
| type | stream type of the source within the zone |
| from | an application specific role identifier. default is all. (optional) |
| priority | either a numerical priority value or a reference to a logic tree that yields a numerical priority value (optional) |
| topology | allows a stream to be server mixed or direct connect by default or reference a logic tree that determines whether a stream should be server mixed or direct connect by default (optional) |
| preferred_bandwidth | default bandwidth to allocate to stream type within the zone (optional) |
| minimum_bandwidth | minimum bandwidth needed by stream type within the zone (optional) | iii. <sink>

The <sink> tags are child elements of <stream> that define a destination for the stream by zone and user role.
The <sink> element has the following attributes:

| | |
|---|---|
| id | name |
| zone | name of destination zone |
| type | stream type of the sink within the destination zone (optional) |
| to | an application specific role identifier. default is all. (optional) |
| radius | a distance within which a source and sink should be connected (optional) | c. COLLADA Streams Reference—Example 1

Here is an example of a description of two zones: zonename1 and zonename2.

```
< geometry id = "myRoomMesh" >
    < zone_mesh volume = "interior"
        convex_hull_of = "#myArbitraryMesh"/ >
< /geometry >
...
< library_zones >
    < zone id = "zonename1" boundary = "myRoomMesh" >
        < stream type = "voice" from = "participant" >
            < sink id = "voice_primary" zone = "zonename1"/ >
            < sink id = "voice_monitor" zone = "zonename2" to =
                "moderator" radius = 10/ >
        < /stream >
        < stream type = "chat" >
            < sink id = "chat_primary" zone = "zonename1"/ >
        < /stream >
        < stream type = "audio" from = "moderator" >
            < sink id = "room_music" zone = "zonename1" to =
                !"moderator"/ >
        < /stream >
    < /zone >
    < zone id = "zonename2" boundary = "anotherMesh" >
        ...
    < /zone >
< /library_zones >
```

In this example, the <geometry> element is a COLLADA element that describes the shape of a volume in a scene (e.g. a virtual room). The <zone_mesh> element is a COLLADA Streams Reference element as defined above that establishes the relationship between a zone boundary and an existing mesh. The <library_zones> element declares a set of <zone> elements that contains the zones "zonename1" and "zonename2".

The boundary of zonename1 corresponds to the interior volume of a convex hull that is computed by the <geometry> referenced by the URI "#myArbitraryMesh". The boundary of zonename2 corresponds to the geometric mesh defined by "anotherMesh".

The first switching rule that is associated with zonename1 specifies that one copy of each voice data stream that is sourced from zonename1 is sent to each object in zonename1 that is capable of sinking a voice data stream and having a "participant" role attribute. The first switching rule also specifies that a copy of each voice data stream that is sourced from zonename1 is sent to each object in zonename2 that is capable of sinking a voice data stream and has a "moderator" role attribute. The second switching rule that is associated with zonename1 specifies that one copy of each chat data stream that is sourced from zonename1 is sent to each object in zonename1 that is capable of sinking a chat data stream. The third switching rule that is associated with zonename1 specifies that one copy of each audio data stream that is sourced from zonename1 and associated with a "moderator" role attribute is sent to each object in zonename1 that is capable of sinking an audio data stream and is not associated with the moderator role attribute.

d. COLLADA Streams Reference—Example 2

Here is an example of a COLLADA Streams Reference description of a virtual area that models a concert hall that contains two zones: StageZone and AudienceZone.

```
< geometry id = "RoomMesh" >
    < zone_mesh volume = "interior"
    convex_hull_of = "#FullRoomMesh"/ >
< /geometry >
< geometry id = "StageMesh" >
    < zone_mesh volume = "interior"
    convex_hull_of = "#StageMesh"/ >
< /geometry >
...
< library_zones >
    < zone id = "StageZone" boundary = "StageMesh" >
        < stream type = "voice" from = "lead_singer"
        priority = 1 topology = direct >
            < sink id = "singer_voice" zone =
            "AudienceZone" to = "audience"/ >
            < sink id = "singer_monitor" zone =
            "StageZone" to = "all_performers"/ >
        < /stream >
        ...
    < /zone >
    < zone id = "AudienceZone" boundary = "RoomMesh" >
        < stream type = "voice" priority = 2 >
            < sink id = "fan_voice" zone = "AudienceZone"/ >
        < /stream >
        < stream type = "chat" topology = server_mix >
            < sink id = "chat_primary" zone = "AudienceZone"/ >
        < /stream >
    < /zone >
< /library_zones >
```

In this example, the boundary of StageZone corresponds to the geometric mesh defined by "StageMesh". The boundary of AudienceZone corresponds to the geometric mesh defined by "RoomMesh".

The switching rule that is associated with StageZone specifies that one copy of each voice data stream that is sourced from StageZone and associated with the "lead_singer" attribute is sent to each object in AudienceZone that is capable of sinking a voice data stream and having an "audience" role attribute. The copies of the voice data stream are to be sent with a priority level of 1 and with a preference for a direct stream handling topology. The switching rule also specifies that a copy of each voice data stream that is sourced from StageZone and associated with the "lead_singer" attribute is sent to each object in StageZone that is capable of sinking a voice data stream and having a "all_performers" role attribute.

The first switching rule that is associated with AudienceZone specifies that one copy of each voice data stream that is sourced from AudienceZone is sent with a priority level of 2 to each object in AudienceZone that is capable of sinking a voice data stream. The second switching rule that is associated with AudienceZone specifies that one copy of each chat data stream that is sourced from AudienceZone is sent to each object in AudienceZone that is capable of sinking a chat data stream with a preference for a server mix.

C. Creating a Virtual Area Specification

Figure 5:
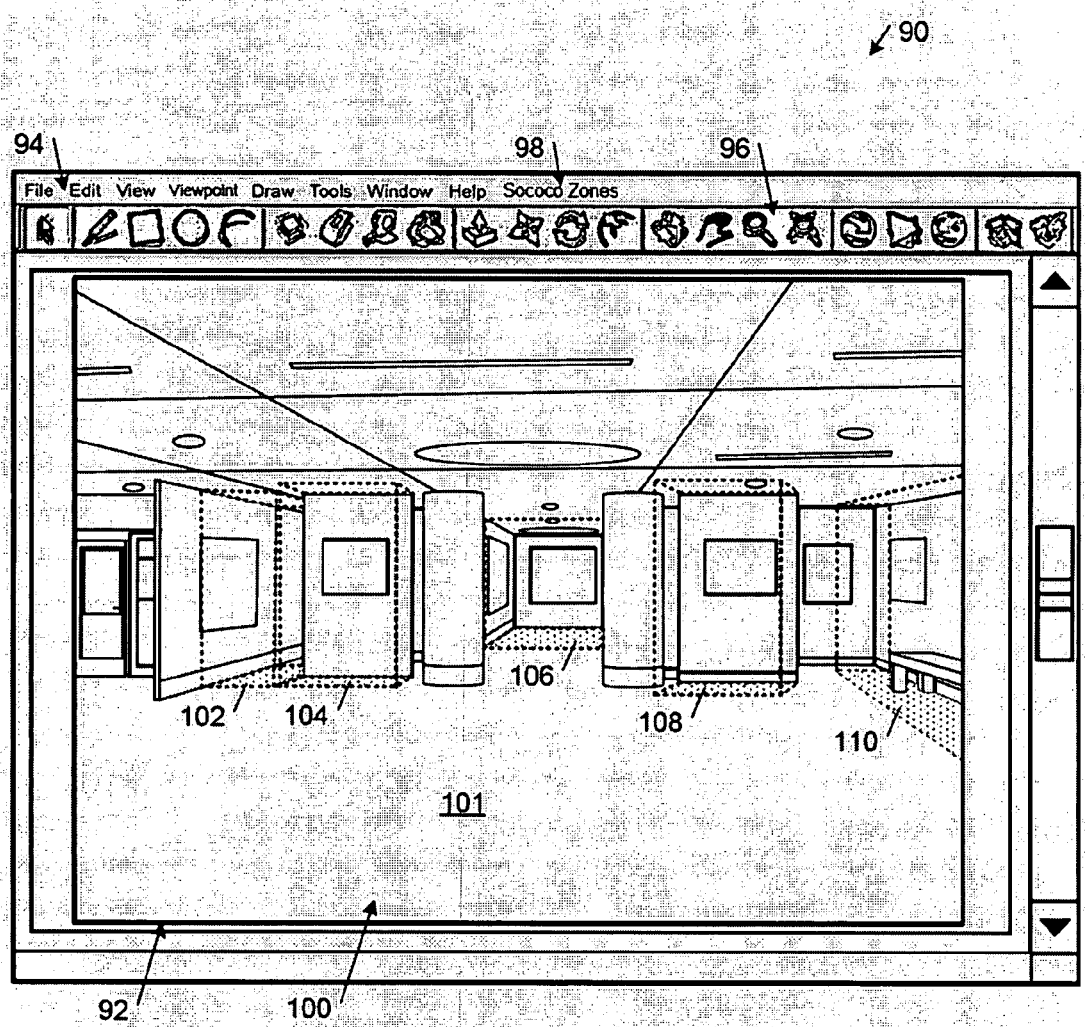
FIG. 5 is a diagrammatic view of an embodiment of a graphical user interface showing a perspective view of a virtual area that includes zones that are associated with respective real-time data stream switching rules.

FIG. 5 shows an embodiment of a graphical user interface 90 of a three-dimensional graphic design tool for creating a specification of a virtual area. The graphical user interface 90 includes a drawing area 92, menus 94, and toolbars 96.

The menus 94 provide access to drawing tools, commands, and settings. The exemplary set of menus 94 shown in FIG. 5A include File, Edit, View, Viewpoint, Draw, Tools, Windows, and Help. The set of menus 94 also includes a Sococo Zones menu 98, which provides access to tools for defining zones and stream connections in a virtual area. These tools may be integral components of the three-dimensional graphic design tool or may be provided as part of a plug-in extension to a three-dimensional graphics tool, such as SketchUp (available from Google Inc. of Mountain View, Calif. USA), Maya or 3ds Max (both available from Autodesk of San Rafael, Calif. USA).

The toolbars 96 contain a user-definable set of tools and controls. The exemplary set of toolbars 96 shown in FIG. 5 corresponds to tools and commands that typically are found in three-dimensional graphic design tools, such as the SketchUp 6 three-dimensional graphics design software application program.

Figure 6:
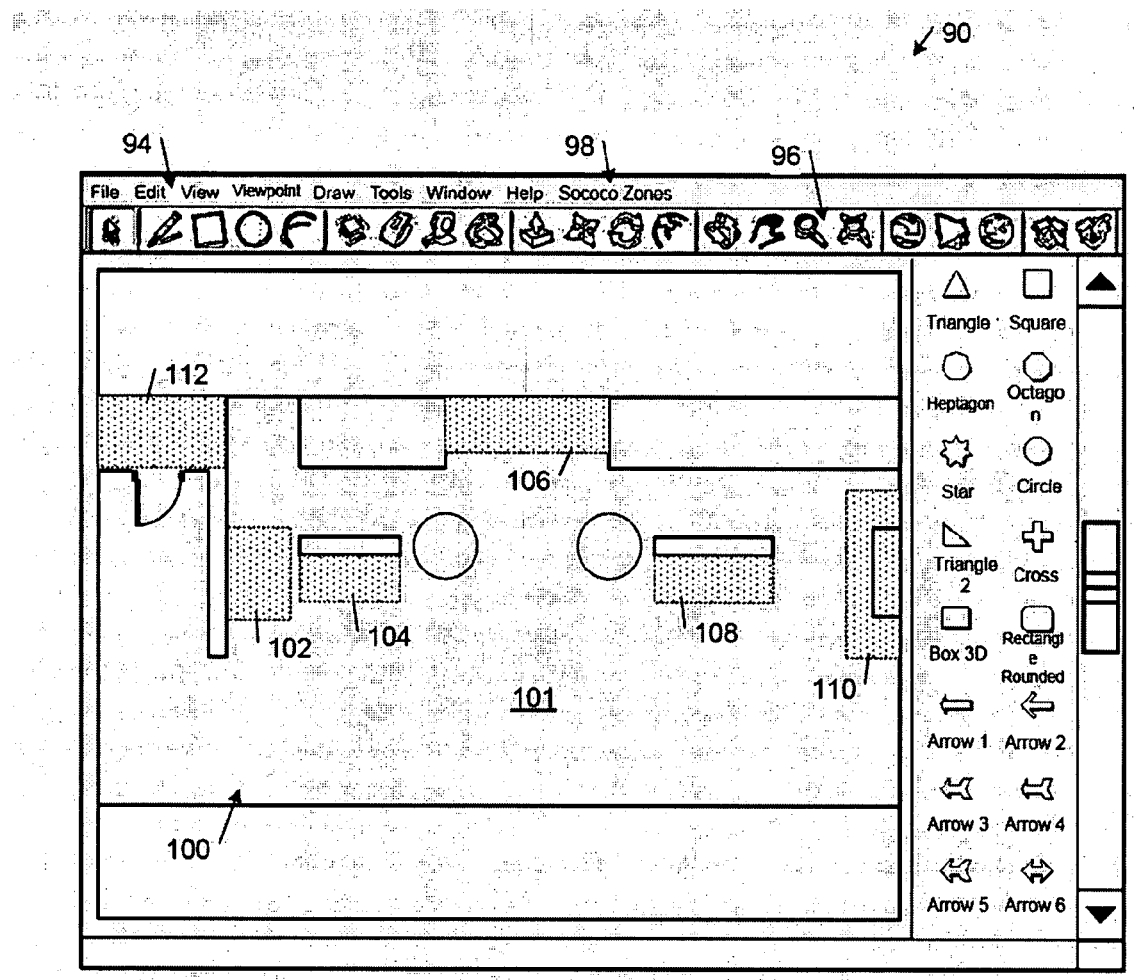
FIG. 6 is a diagrammatic view of an embodiment of a graphical user interface showing a plan-view of the three dimensional virtual area shown in FIG. 5.

The drawing area 92 is where an area designer creates a three-dimensional model of a virtual area. In FIG. 5, the drawing area 92 of the graphical user interface 90 shows a perspective view of a three-dimensional virtual area 100. In FIG. 6, the drawing area 92 of the graphical user interface 90 shows a plan-view of the virtual area 100. The geometric elements (e.g., the walls, ceilings, floors, columns, bench, and light fixtures) of the virtual area 100 typically are defined using standard tools and commands that typically are found in three-dimensional graphic design tools, such as the SketchUp 6 three-dimensional graphics design software application program.

As shown in FIGS. 5 and 6, in addition to geometric elements, the virtual area 100 additionally includes zones 101, 102, 104, 106, 108, 110, 112, which are demarcated by dashed line boundaries. Each of the zones 101-112 is associated with one or more respective real-time data stream switching rules. The zones 102-112 are specified using the tools and commands that are accessible through the Sococo Zones menu 98. In some embodiments, the area designer may specify the boundaries of each of the zones 101-112 using standard three-dimensional graphics design tools and then select one or more of the Sococo Zones design tools to associate the boundary with a respective <zone_mesh> tag and to specify the attributes of that <zone_mesh> tag. In some of these embodiments, the Sococo Zones design tools guide the user through the process of defining each zone such that it can be represented using the COLLADA Streams Reference specification described above (e.g. <zone>, <stream> and <sink> tags).

V. First System Architecture Embodiment

A. General System Overview

Communicants typically access a shared virtual area communication environment from respective network nodes. Each of these network nodes typically is implemented by a general-purpose computer system or a dedicated communications computer system (or "console"). Each network node executes communications processes that present a respective view of the virtual area at each network node and establish real-time data stream connections with other network nodes.

Figure 7:
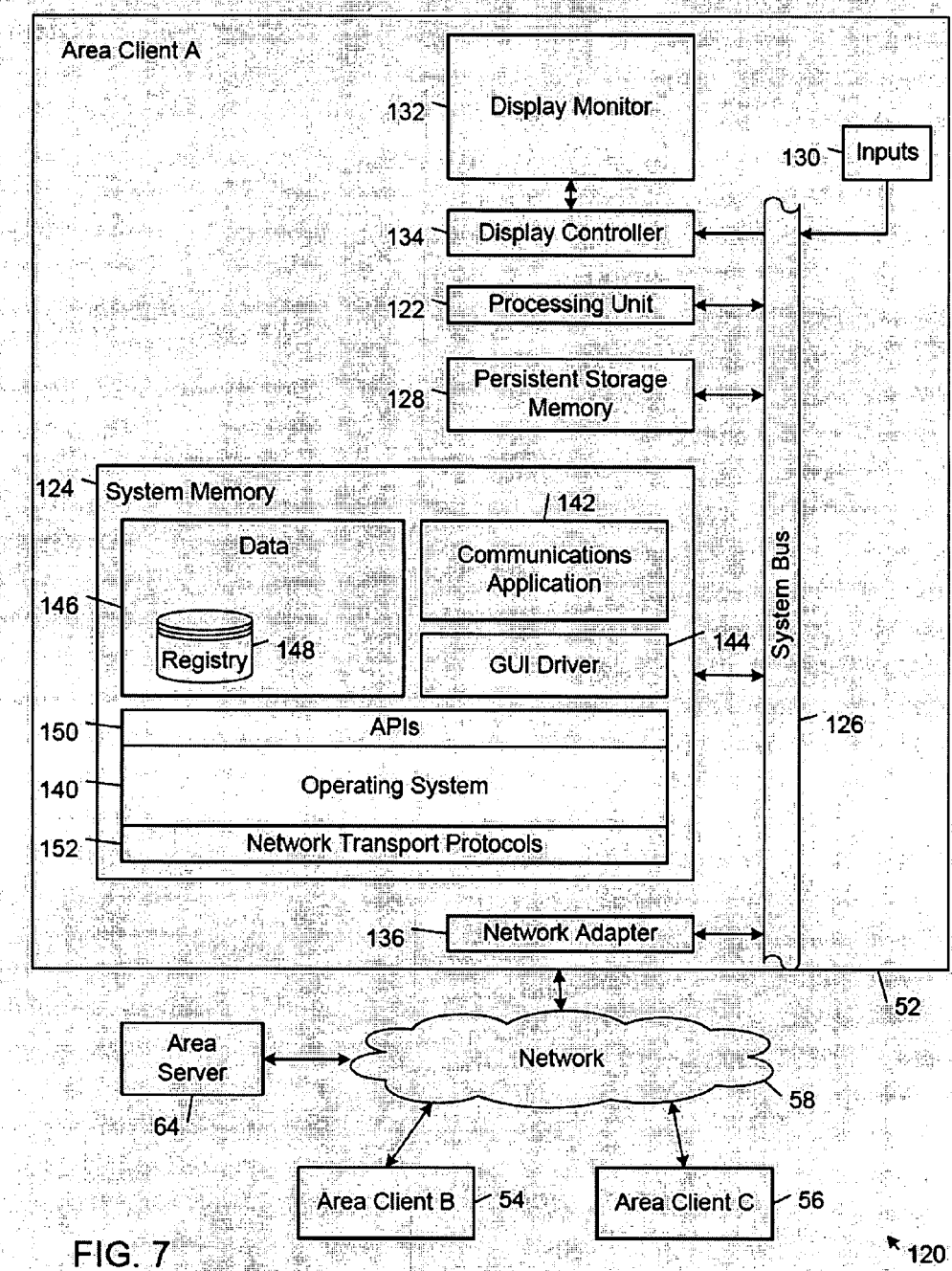
FIG. 7 is a block diagram of an embodiment of an area client network node connected to an area server network node and two other area client network nodes in an embodiment of a shared virtual area communication environment.

FIG. 7 shows an embodiment of a server-mediated, shared virtual area communication environment 120 in which the network nodes 52-56 (referred to as "area client network nodes" or simply "area clients" in this architecture) and the area server 64 are interconnected by the communications network 58. In this embodiment, each of the area client network nodes 52-56 is implemented by a respective computer system of the type described below in connection with area client server network node 52; the area server 64 also is implemented by a general purpose computer system of the same type described below.

As shown in FIG. 7, the area client network node 52 is implemented by a computer system that includes a processing unit 122, a system memory 124, and a system bus 126 that couples the processing unit 122 to the various components of the computer system. The processing unit 122 may include one or more data processors, each of which may be in the form of any one of various commercially available computer processors. The system memory 124 may include a read only memory (ROM) that stores a basic input/output system (BIOS) that contains start-up routines for the computer system and a random access memory (RAM). The system bus 126 may be a memory bus, a peripheral bus or a local bus, and may be compatible with any of a variety of bus protocols, including PCI, VESA, MicroChannel, ISA, and EISA. The computer system also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions. A communicant may interact (e.g., input commands or data) with the computer system using one or more input devices 130 (e.g. one or more keyboards, computer mice, microphones, cameras, joysticks, physical motion sensors such Wii devices, and touch pads). Information may be presented through any of a two-dimensional graphical user interface (GUI) or a three-dimensional GUI that is presented to the communicant on a display monitor 132, which is controlled by a display controller 134. The computer system also may include peripheral output devices, such as speakers and a printer. The computer system connects to other area client network nodes 54, 56 and the area server 64 through a network adapter 136 (also referred to as a "network interface card" or NIC).

A number of program modules may be stored in the system memory 124, including but not limited to an operating system 140 (e.g., the Windows XP® operating system available from Microsoft Corporation of Redmond, Wash. U.S.A.), a communications application 142, a GUI driver 144, and data 146. Exemplary types of data 146 include input data, output data, and program data, such as a registry (or configuration database) 148.

The operating system 140 includes an executive that provides the base operating system services (e.g., memory management, process and thread management, security, input/output, and interprocess communication) for creating a run-time execution environment on the computer system. The registry 148 typically contains the following information: parameters needed to boot and configure the system; system-wide software settings that control the operation of operating system 140; a security database; and per-user profile settings. A native operating system (OS) application programming interface (API) 150 exposes the base operating system services of the executive to the communications application 142 and other user applications. As used herein, the term "service" (or "service module") refers to a component of an operating system that provides a set of one or more functions.

In some embodiments, the communications application 142 includes processes that control the presentation of a respective view of a virtual area and objects in the virtual area on the display monitor 132 and processes that control the switching of real-time data streams between the area client network node 52 and the other area client network nodes 54, 56 and the area server 64. The communications application 142 interfaces with the GUI driver 144 and the user input 130 to present the views of the virtual area and to allow the communicant to control the operation of the communications application 142.

Embodiments of the communications application 142 may be implemented by one or more discrete modules (or data processing components) that are not limited to any particular hardware, firmware, or software configuration. In general, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components. In some implementations, process instructions (e.g., machine-readable code, such as computer software) for Implementing the methods that are executed by the embodiments of the communications application 142, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM. Embodiments of the communications application 142 may be implemented in any one of a wide variety of electronic devices, including personal computing devices (e.g., desktop computers, mobile computers, and communications devices), network devices (e.g., server computers, routers, switches, and hubs), game consoles, cable TV and hybrid set-top boxes, and modems.

The execution environment stored in the system memory 124 also includes a set of network transport protocols 152 for transmitting and receiving real-time data streams.

In some embodiments, communications over the network 58 are conducted in accordance with the Transmission Control Protocol/Internet Protocol (TCP/IP). The TCP portion of the protocol provides the transport function by breaking a message into smaller packets, reassembling the packets at the other end of the communication network, and re-sending any packets that get lost along the way. The IP portion of the protocol provides the routing function by assigning to the data packets addresses for the destination network and the target node at the destination network. Each data packet that is communicated using the TCP/IP protocol includes a header portion that contains the TCP and IP information. The IP protocol provides no guarantee of packet delivery to the upper layers of the communications stack. The TCP protocol, on the other hand, provides a connection-oriented, end-to-end transport service with guaranteed, in-sequence packet delivery. In this way, the TCP protocol provides a reliable, transport layer connection.

In other embodiments, communications over the network 58 may be conducted in accordance with the User Datagram Protocol/Internet Protocol (UDP/IP). UDP may be used in place of TCP in conditions when a reliable delivery is not required. For example, UDP/IP may be used for real-time audio and video traffic where lost data packets are simply ignored because of any of the following reasons: there is no time to retransmit or any degradation of overall data quality is acceptable.

Some embodiments may use the Java Media Framework (JMF), which supports device capture, encoding, decoding, rendering, and the Real-Time Transport Protocol (RTP). A variety of network protocols may be used in transmitting and receiving RTP data between the area client network nodes 52-56, including peer-to-peer networking frameworks, a centralized server using TCP sockets alone or in combination with UDP, or multicast protocols.

The execution environment also includes hardware link level and access protocols, which may correspond to the Data link and Physical layers of the Open System Interconnection (OSI) reference model.

In the illustrated embodiments, communications between the area client network nodes 52-56 and the area server 64 are conducted in accordance with the TCP/IP protocol. In these embodiments, the computer system determines an IP address for each of its network interfaces before it communicates using TCP/IP. This process may involve contacting a server to dynamically obtain an IP address for one or more of its network interfaces. The computer system may use a Dynamic Host Configuration Protocol (DHCP) to issue a request for an IP address to a DHCP server. In this regard, the computer system broadcasts a DHCP request packet at system start up requesting allocation of an IP address for an indicated network interface. Upon receiving the DHCP request packet, the DHCP server allocates an IP address to the computer system for use with the indicated network interface. The computer system then stores the IP address in the response from the server as the IP address to associate with that network interface when communicating using an IP protocol.

B. Exemplary System Architecture

Figure 8:
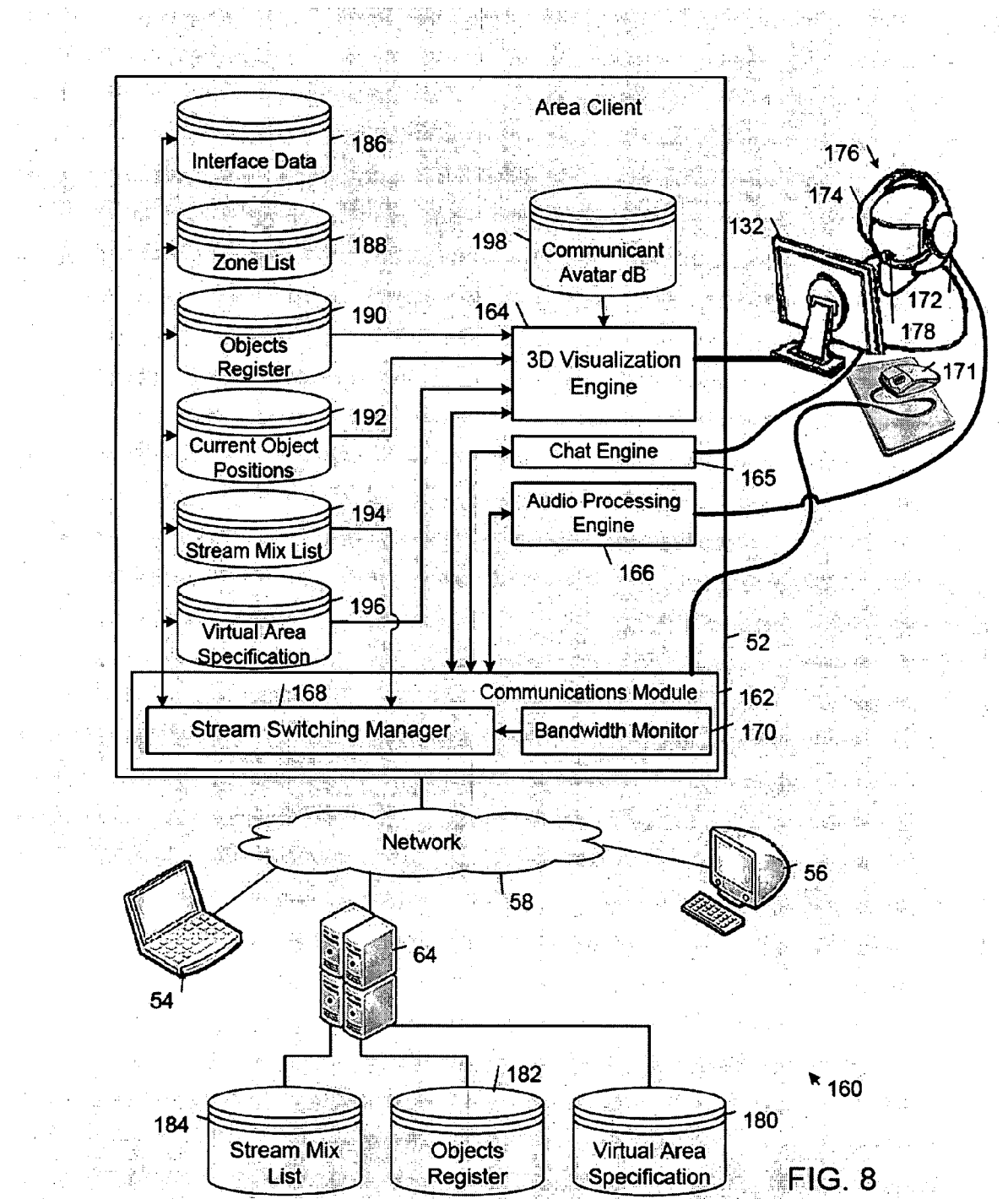
FIG. 8 is a diagrammatic view of an embodiment of the shared virtual area communication environment shown in FIG. 7.

FIG. 8 shows an embodiment 160 of the server-mediated, shared virtual area communication environment 120 shown in FIG. 7, where the area client network nodes 52-56 communicate in an architecture that is mediated by the area server 64.

The area server 64 maintains global state information and serves as a data server for the area client network nodes 52-56. Among the global state information that is maintained by the area server are a current specification 180 of the virtual area, a current register 182 of the objects that are in the virtual area, and a list 184 of any stream mixes that currently are being generated by the area server 64.

As explained above, the virtual area specification 180 includes a description of geometric elements of the virtual area and one or more switching rules. Each of the switching rules defines a respective connection between sources of a respective real-time data stream type and sinks of the real-time data stream type in terms of positions in the virtual area. In some embodiments, the geometric elements of the virtual area are described in accordance with the COLLADA—Digital Asset Schema Release 1.4.1 specification, and the switching rules are described in accordance with the proposed COLLADA Streams Reference specification described above.

The objects register 182 typically includes for each object in the virtual area a respective object identifier (e.g., a label that uniquely identifies the object), connection data (e.g., an IP address) enabling a network connection to be established with a network node that is associated with the object, and interface data identifying the real-time data sources and sinks that are associated with the object (e.g., the sources and sinks of the network node that is associated with the object). The objects register 182 also typically includes for each object one or more optional role identifiers, which may be assigned explicitly to the objects by either the communicants or the area server 64, or may be inferred from other attributes of the objects. In some embodiments, the objects register 182 also includes the current position of each of the objects in the virtual area as determined by the area server 64 from an analysis of the real-time motion data streams received from the area client network nodes 52-56. In this regard, the area server 64 receives real-time motion data streams from the area client nodes 52-56, tracks the communicants' avatars and other objects that enter, leave, and move around in the virtual area based on the motion data. The area server 64 updates the objects register 182 in accordance with the current locations of the tracked objects.

In the embodiment shown in FIG. 8, the area client network node 52 includes an embodiment of the communications application 142 (see FIG. 7) that includes a communications module 162, a three-dimensional visualization engine 164, a chat engine 165, and an audio processing engine 166. Each of the other network nodes 54, 56 typically includes an embodiment of a communication application 142 that is that the same or similar to the one described in connection with area client network node 52.

The communications module 162 controls the switching of real-time data streams between the area client network node 52 and the other area client network nodes 54, 56 and the area server 64. The communications module 162 includes a stream switching manager 168 and a bandwidth monitor 170. The stream switching manager 168 handles the entry and exit of avatars and other objects associated with the area client network node 52 to and from a virtual area. The stream switching manager 168 also automatically determines how to switch (e.g., route, connect and disconnect) real-time data streams between the area client network node 52 and the other area client network nodes 54, 56 and the area server 64. The steam switching manager 168 makes these determinations based on the switching rules contained in the virtual area specification, the current locations of the avatars and other objects in the virtual area, and the real-time data stream types that are associated with the avatars and other objects in the virtual area. In some embodiments, the stream switching manager 168 also factors into these determinations upload and download bandwidth constraints of any of the area client network node 52, other network nodes 54, 56, or the area server 64. In addition, the stream switching manager 168 re-evaluates the current set of connections either in response to events (e.g., upload or download bandwidth faults, and requests to enter or exit a virtual area), periodically, or both in response to events and periodically. As a result of the re-evaluation of the current connections, the stream switching manager 168 may, for example, take any of the following actions: request stream mixes from the area server 64, drop stream mixes from the area server, break one or more direct links with one or more of the other area client network nodes 54, 56, or form one or more direct links with one or more of the other area client network nodes 54, 56.

In the course of managing the switching of real-time data stream connections the stream switching manager 168 maintains a set of configuration data, including interface data 186, a zone list 188, and the positions 192 of the objects that currently are in the virtual area. The interface data 186 includes for each object associated with the area client network node 52 a respective list of all the sources and sinks of real-time data stream types that are associated with the object. The zone list 188 is a register of all the zones in the virtual area that currently are occupied by the avatar associated with the area client network node 52. When the communicant first enters a virtual area, the stream switching manager 168 typically initializes the current object positions database 192 with position initialization information that is downloaded from the area server 64. Thereafter, the stream switching manager 64 updates the current object positions database 192 with the current positions of the objects in the virtual area as determined from an analysis of the real-time motion data streams received from, for example, one or more of the computer mouse 171, the area client network nodes 54, 56, and the area server 64. In some embodiments, the object positions 192 are incorporated into the objects register 190. The configuration data that are maintained by the stream switching manager 168 also includes copies 190, 192, 196 of the objects register 182, the stream mix list 184, and the virtual area specification 180, respectively; these copies 190, 194, and 196 typically are downloaded from the area server 64 and represent a local cache of these data.

The three-dimensional visualization engine 164 presents on the display monitor 132 a view of the virtual area and any objects that are in the virtual area. In this process, the three-dimensional visualization engine 164 reads the virtual area specification data 196, the objects register 190, and the current object positions database 192. In some embodiments, the three-dimensional visualization engine 164 also reads a communicant avatar database 198 that contains images needed for rendering the communicant's avatar in the virtual area. Based on this information, the three-dimensional visualization engine 164 generates a perspective representation (i.e., an image) of the virtual area and the objects in the virtual area from the point of view (position and orientation) of the communicant's avatar in the virtual area. The three-dimensional visualization engine 164 then renders the perspective representation of the virtual area on the display monitor 132. In some embodiments, three-dimensional visualization engine 164 determines the visibility of the communicant's avatar in order to limit the amount of data that has to be exchanged, processed and rendered to the portion of the virtual area that is visible on the display monitor 132.

In some embodiments, the three-dimensional visualization engine 164 additionally is operable generate a plan-view representation of the virtual area. In these embodiments, the communicant may direct the three-dimensional visualization engine 164 to render one or both of the perspective representation of the virtual area and the plan-view representation of the virtual area on the display monitor 132.

The communicant can control the presented view of the virtual area or the position of the avatar in the virtual area by transmitting commands to the communications module 162 from an input device (e.g., the computer mouse 171). The three-dimensional visualization engine 164 updates the view of the virtual area and the positions of the objects in the virtual area in accordance with updated positions in the current object positions database 192 and re-renders an updated version of the graphic representation of the virtual area on the display monitor 132. The three-dimensional visualization engine 164 may update the rendered image periodically or only in response to movement of one or more of the objects in the virtual area.

The chat engine 165 provides an interface for outgoing chat (text) messages that are received from a local text input device (e.g., a keyboard) of the area client network node 52 and incoming chat streams that are received from the other area client network nodes 54, 56. The chat engine 165 converts the chat (text) messages that are input by the communicant through the text input device into real-time chat streams that can be transmitted to the other network nodes 54, 56. The chat engine 165 also converts the incoming chat streams into text signals that can be rendered on the display monitor 132.

The audio processing engine 166 generates audio signals, which are rendered by the speakers 172, 174 in the communicant's headset 176, and converts the audio signals that are generated by the microphone 178 in the headset 176 into real-time audio streams that can be sent to the other area client network nodes 54, 56.

VI. Automated Switching of Real-Time Data Streams

A. Introduction

As explained above, a shared virtual area is defined by a specification that includes a description of geometric elements of the virtual area and one or more switching rules governing real-time stream connections between the network nodes. The switching rules typically include a description of conditions for connecting sources and sinks of real-time data streams in terms of positions in the virtual area. Each rule typically includes attributes that define the real-time data stream type to which the rule applies and the location or locations in the virtual area where the rule applies. In some embodiments, each of the rules optionally may include one or more attributes that specify a required role of the source, a required role of the sink, a required priority level of the stream, and a required or preferred stream topology.

The switching rules are implicated upon object entry into a virtual area, movement of an object within the virtual area, and object exit from the virtual area.

B. Virtual Area Entry

Figure 9:
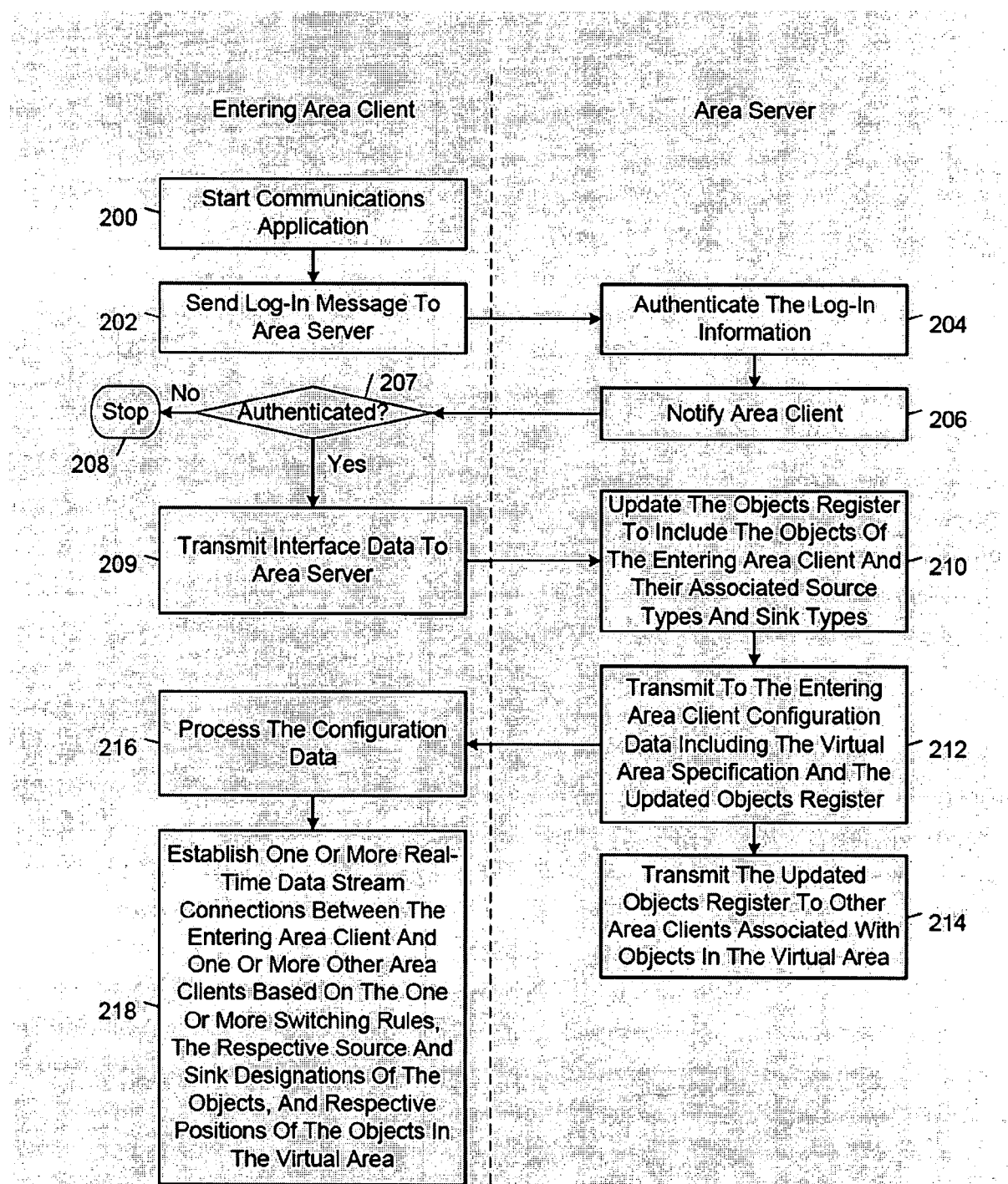
FIG. 9 is a flow diagram of an embodiment of a method that is executed by an area client network node and an area server network node.

FIG. 9 shows an embodiment of a method by which an area client (referred to in this section as the "entering area client") enters a virtual area.

A communicant begins a communication session by starting the communications application 142 (see FIG. 7) on an area client network node (FIG. 9, block 200). The communications application 142 presents the communicant with a graphical user interface through which the communicant can interact with the application 142. The graphical user interface typically provides the communicant with an option to log-in to a shared virtual area.

In response to receipt of a command to log-in to a shared virtual area, the communications application 142 sends a login message to the area server 64 (FIG. 9, block 202). The log-in message typically includes log-in information for identifying and authenticating the communicant.

The area server 64 authenticates the log-in information contained in the log-in message (FIG. 9, block 204) and notifies the area client of the result (FIG. 9, block 206).

If the authentication succeeds (FIG. 9, block 207), the communications application 142 transmits interface data to the area server 64 (FIG. 9, block 209). The interface data includes for each object that will be entering the area and an identification of all real-time data stream source types and sink types that respectively are associated with the object. If the authentication fails (FIG. 9, block 207), the communications application 142 stops the log-in session and notifies the communicant of the failed log-in attempt (FIG. 9, block 208).

The area server 64 updates the objects register 190 (see FIG. 9) to include the objects that are associated with the entering area client and the real-time data stream source types and sink types that are associated with these objects (FIG. 9, block 210). The area server 64 transmits configuration data to the entering area client (FIG. 9, block 212). The configuration data includes a copy of the virtual area specification 180 (see FIG. 8) and a copy of the updated objects register 182 (see FIG. 8). In some embodiments, the configuration data additionally includes a copy of the stream mix list 184 (see FIG. 8), which identifies the mixes (or combinations) of the area client real-time data streams that currently are being generated by the area server 64. The area server 64 also transmits respective copies of the updated objects register 180 to other area clients that are associated with objects in the virtual area (FIG. 9, block 214). As explained above, the area server 64 receives real-time motion data streams from the area client nodes 52-56, tracks the communicants' avatars and other objects that enter and leave the virtual area based on the motion data, and updates the objects register 182 in accordance with the current locations of the tracked objects. The area server 64 periodically transmits the updated objects register 182 to the area clients that are associated with objects that are in the virtual area.

The communications application 142 executing on the entering area client network node processes the virtual area specification and the objects register as described in detail below (FIG. 9, block 216). The communications application 142 then establishes one or more real-time data stream connections between the entering area client network node and one or more of the other area clients listed in the objects register based on the switching rules that are defined in the virtual area specification, the respective sources and sinks that are associated with the objects that are listed in the received copy of the objects register 182, and respective the positions of the objects in the virtual area (FIG. 9, block 218). In the process of establishing these connections, the communications application 142 initiates and configures component modules that enable capture, playback, streaming, and transcoding of that real-time data streams that are available on the entering area client network node. These components typically include the chat engine 165, the audio processing engine 166, and other components (e.g., a video processing engine for encoding video data received from a local video capture device and decoding real-time video stream packets received from remote network nodes).

Figure 10:
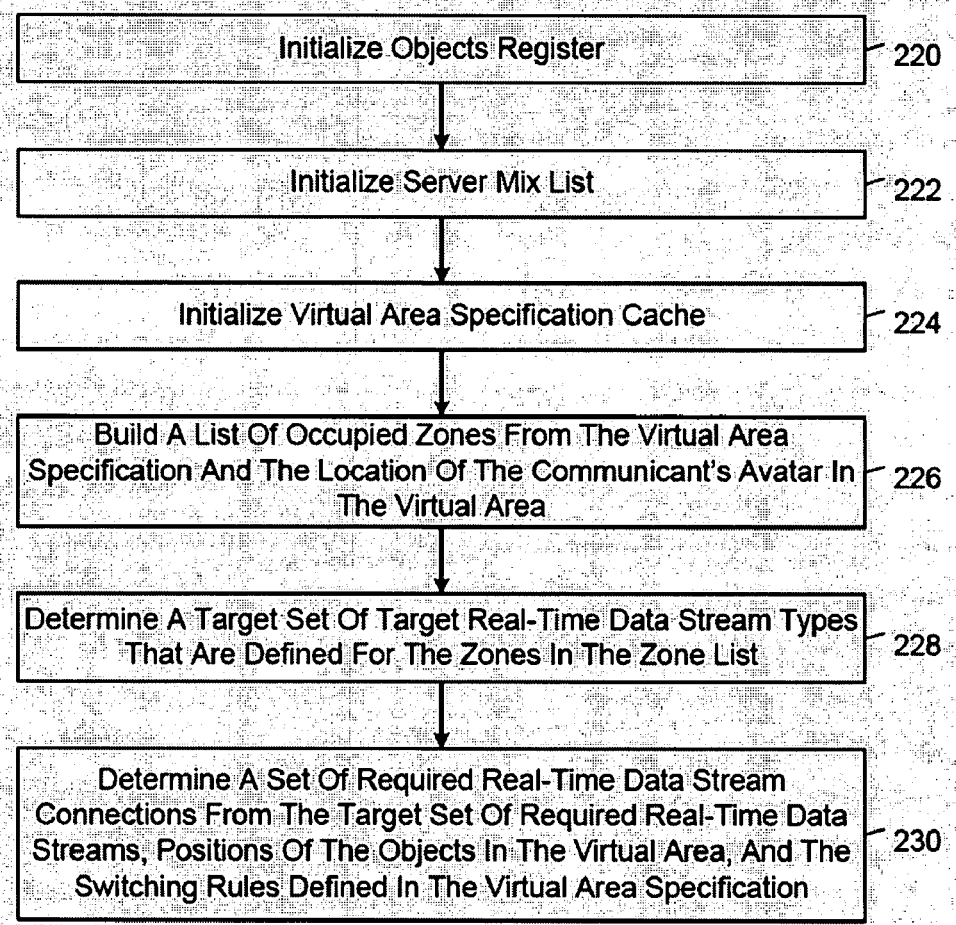
FIG. 10 is a flow diagram of an embodiment of a method by which an embodiment of a stream switching manager processes configuration data received from an area server.

C. Processing Configuration Data to Determine a Set of Required Real-Time Data Stream Connections FIG. 10 is a flow diagram of an embodiment of a method in accordance with which an embodiment of the stream switching manager 168 (FIG. 8) processes the configuration data that is received from the area server 64 in block 216 of the method of FIG. 9 in order to determine a set of required real-time data stream connections. As explained above, the configuration data includes a copy of the virtual area specification 180 (see FIG. 8) and a copy of the updated objects register 182 (see FIG. 8). In some embodiments, the configuration data additionally includes the stream mix list 184 (see FIG. 8), which identifies the mixes (or combinations) of the area client real-time data streams that currently are being generated by the area server 64.

The stream switching manager 168 initializes the local objects register 190 (see FIG. 8) with the copy of the objects register 182 received from the area server 64 (FIG. 10, block 220). The stream switching manager 168 also initializes the local stream mix list 194 (see FIG. 8) with the copy of the stream mix list 184 received from the area server 64 (FIG. 10, block 222). The stream switching manager 168 additionally initializes the local virtual area specification cache 196 (see FIG. 8) with the copy of the virtual area specification 180 that is received from the area server 64 (FIG. 10, block 220).

The stream switching manager 168 builds a list 188 (see FIG. 8) of occupied zones from the virtual area specification 196 and the location of the communicant's avatar in the virtual area (FIG. 10, block 226). In this process, the stream switching manager 168 retrieves the current position of the communicant's avatar in the virtual area from the current object positions database 192, which contains the coordinates of the avatar's current position in the virtual area. These coordinates are determined from the real-time motion data stream received from an input device, such as the computer mouse 171. The stream switching manager 168 then compares the current position of the communicant's avatar with the zone definitions in the virtual area specification 196. The stream switching manager 168 compiles the occupied zones list 188 from all the zones in the virtual area specification that coincide with the current position of the communicant's avatar. For example, in some embodiments, the occupied zones list 188 consists of all the zones whose meshes contain the current position of the communicant's avatar.

The stream switching manager 168 determines a set of target real-time data stream types that are defined for the zones in the occupied zones list (FIG. 10, block 228). The stream switching manager 168 then determines a set of required real-time data stream data from the set of target real-time data stream types, the positions of the objects in the virtual area, and the switching rules defined in the virtual area specification (FIG. 10, block 230).

In some exemplary embodiments, the stream switching manager 168 ascertains ones of the objects, excluding the given object, that are contained in one or more of the zones from which ones of the real-time data stream types in the target set are sourced and into which ones of the real-time data stream types in the target set are sunk as defined by the one or more switching rules. The stream switching manager 168 determines a connectable set of real-time data streams based on the ascertained objects. Each of the connectable streams is at least one of (i) sourced from one or more of the network nodes that are associated with the ascertained objects and (ii) sunk into one or more of the network nodes that are associated with the ascertained objects. The stream switching manager 168 then determines the set of required real-time data stream data based on a matching of the sources and sinks that are associated with the connectable set of real-time data streams.

In some of these embodiments, the set of required real-time data stream data corresponds to the real-time data streams that can be sunk into the zones occupied by the communicant's avatar in accordance with the switching rules and the sinks that are available on the area client network node. In these embodiments, the stream switching manager 168 determines the ones of the sinks that are defined for the occupied zones that the associated network node is capable of sinking, and then determines all of the sources of those sinks based on the positions of other objects in the virtual area and the switching rules. In this process, the stream switching manager 168 compiles the set of target real-time data stream types from all the real-time sink types (e.g., audio, chat, video, motion data) that are associated with the communicant's avatar and are defined as sink types for any of the zones that are occupied by the communicant's avatar. The stream switching manager 168 then determines from the switching rules all the target source zones from which each of the target real-time data stream types can be sourced. The stream switching manager 168 identifies from the objects register 190 and the current object positions database 192 all of the objects in the target source zones that are capable of sourcing one or more of the target real-time data stream types from their current positions in accordance with the switching rules. The stream switching manager 168 compiles the set of the required real-time data stream data from the connection data that are associated with the identified objects in the objects register 190.

Figure 11:
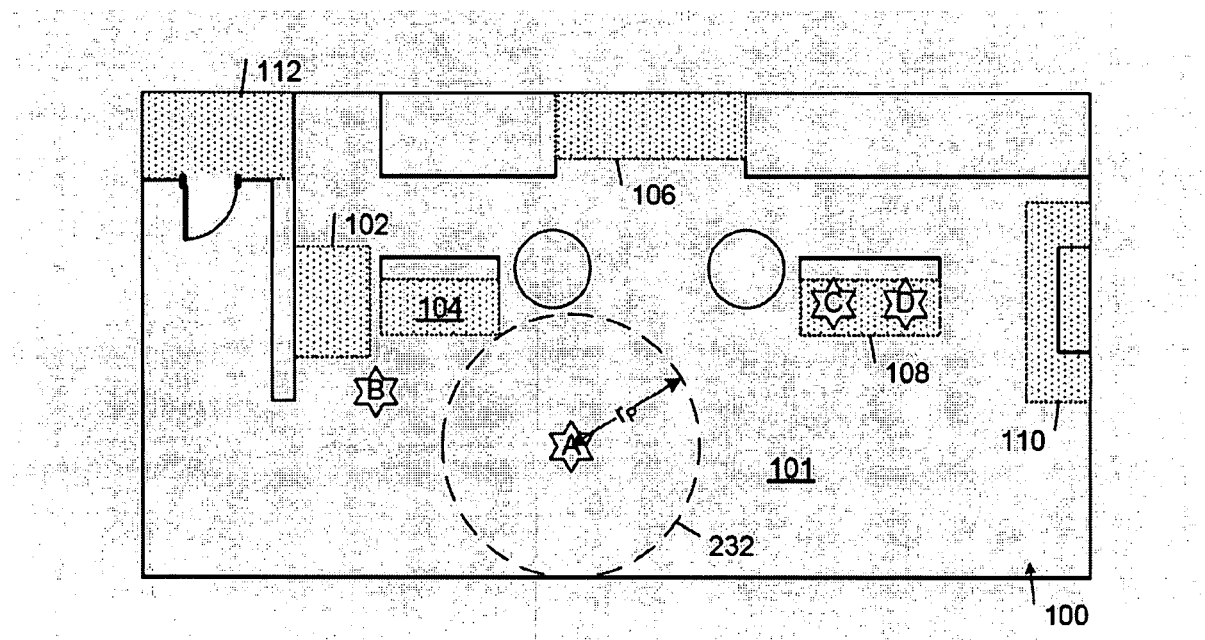
FIG. 11 shows the plan-view of the virtual area shown in FIG. 6, where the virtual area is populated with four avatar objects.

In one illustrative example, FIG. 11 shows a plan-view of the virtual art gallery area 100 (see, e.g., FIGS. 5 and 6), at a time when it is populated with the four avatar objects A, B, C, and D. The avatars A and B are positioned in the zone 101 and the avatars C and D are positioned in the zone 108. For the purpose of this illustrative example:

each of the avatars A-D is associated with voice, video, and chat source types and sink types;

the switching rules for zone 101 specify that
  each voice source that is associated with an avatar within the zone 101 is to be connected to every voice sink within the zone 101,
  each video source that is associated with an avatar within the zone 101 is to be connected to every video sink within the zone 101, and
  each chat source that is associated with an avatar within the zone 101 is to be connected to every chat sink within the zone 101;

the switching rules for zone 108 specifies only that that each voice source that is associated with an avatar within the zone 108 is to be connected to every voice sink within the zone 108; and the stream switching manager 168 implements, on top of the zone switching rules, a proximity policy rule that only allows connections of sources with compatible sinks that are associated with respective objects that are within a prescribed distance (or radius), $r_p$, of each other in the virtual area.

In this example, the zone switching rules and the proximity policy rule provide respective switching conditions that determine how the connections between the avatars A, B, C and D are established.

In operation, the instance of the stream switching manager 168 operating on the area client node that is associated with avatar A would request to be connected to the real-time voice, video, and chat streams that are sourced from the area client node that is associated with avatar B whenever avatar B is positioned within a proximity zone 232, which defined by the prescribed distance $r_p$, around avatar A. Likewise, the instances of the stream switching manager 168 operating on the area client node that is associated with avatar B would request to be connected to the real-time voice, video, and chat streams that are sourced from the area client node that is associated with avatar A whenever avatar A is positioned within the prescribed distance $r_p$ of avatar B. Since avatar B currently is outside the proximity zone 232 of avatar A, and vice versa, the nodes associated with avatars A and B would not be connected to each other in the current exemplary state shown in FIG. 11.

Since zone 108 only allows voice connections, the instance of the stream switching manager 168 operating on the area client node that is associated with avatar C would request to be connected to only the real-time voice stream that is sourced from the area client node that is associated with avatar D (assuming the proximity condition specified in the proximity policy rule is satisfied). Similarly, the instance of the stream switching manager 168 operating on the area client node that is associated with avatar D would request to be connected to only the real-time voice stream that is sourced from the area client node that is associated with avatar C (assuming the proximity condition specified in the proximity policy rule is satisfied).

Since the switching rules for zones 101 and 108 do not allow connections between zones 101 and 108, the sources and sinks that are associated with avatars A and B would not be connected to any of the sources and sinks that are associated with avatars C and D, even if the proximity condition specified in the proximity policy rule is satisfied.

In some embodiments, at least one of the area clients 52-56 includes a network adapter (e.g., an Ethernet interface card) that provides connectivity to the network 58 and is further configured to perform one or more of the functions of the area client stream switching manager 168, including the functions needed to perform the method of FIG. 10.

D. Establishing Real-Time Data Stream Connections

1. Determining Required Real-Time Data Stream Connections

In some exemplary embodiments, after the stream switching manager 168 has determined the set of real-time data stream data that enables the network node 52 to participate in a collaborative communication session with other network nodes in the shared virtual area (FIG. 10, block 230), the stream switching manager 168 determines the real-time data stream connections that will result in the delivery of the required data stream data to the area client network node 52.

In some of these embodiments, the stream switching manager 168 determines a real-time data stream handling topology that delivers the set of real-time data streams to the given network node based at least in part on bandwidth capabilities of the given network node. In this process, the stream switching manager 168 determines a respective form in which to receive each of the real-time data streams from an unmixed real-time data stream and a stream mix derived from a combination of real-time data streams. The stream switching manager 168 also determines a network route over which each of the real-time streams is received from a direct peer-to-peer network route and a network route mediated by one or more of the other network nodes. After the stream handling topology has been determined, the stream switching manager 168 establishes real-time data stream connections between the given network node and other ones of the network nodes in accordance with the determined stream handling topology.

Figure 12:
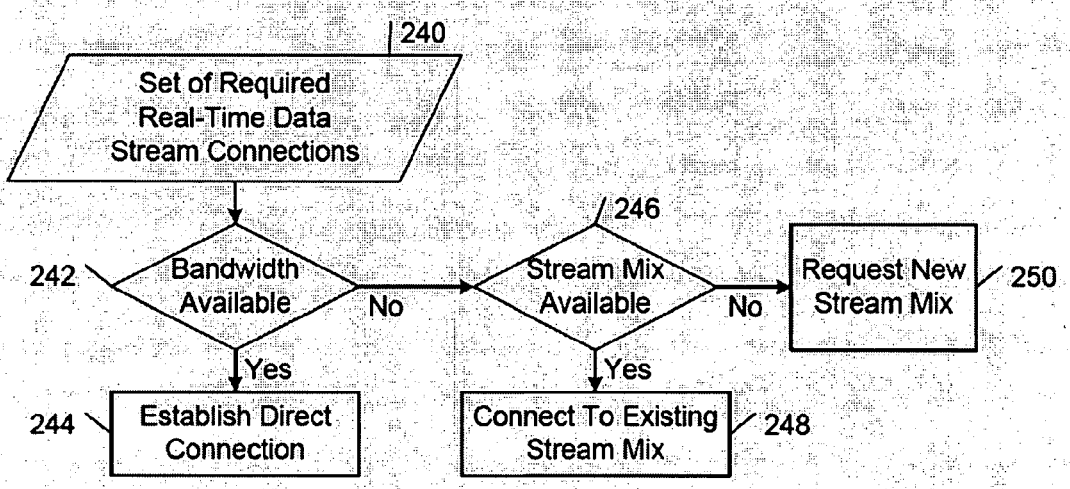
FIG. 12 is a flow diagram of an embodiment of a method of determining real-time data stream connections that deliver required data stream data to an area client network node.

FIG. 12 shows an embodiment of a method of determining a topology of real-time data stream connections that deliver the required data stream data to an area client network node.

In accordance with this method, the stream switching manager 168 determines if the area client network node 52 has sufficient bandwidth to receive the set of required real-time data stream data 240 directly from the other area client network nodes (FIG. 12, block 242). In this process, the other area client network nodes transmit links requests to the area client network node 52. The link requests indicate the respective bandwidth requirements for transmitting the respective sets of real-time data streams needed by the area client network node 52 (see §V.D.2 below). The stream switching manager 168 compares the overall bandwidth that is needed to establish the required direct connections with the download bandwidth that is available currently to the area client network node 52 as reported by the bandwidth monitor 170 (see FIG. 8).

If the available bandwidth is at least equal to the overall required bandwidth, the stream switching manager 168 establishes direct connections with the other area client nodes that provide the required real-time data stream data (FIG. 12, block 244). In this process, the communications application 142 and its associated run-time environment, creates sockets (e.g., TCP sockets or specialized real-time sockets optimized for performance) between the area client network node 52 and one or more of the other area client network nodes 54, 56 and the area server 64. The sockets that are created typically include for each real-time data stream type one socket that carries the real-time data stream and one socket for carrying control information (e.g., quality of service information) that is associated with transmission and reception of the associated real-time data stream packets. The communications application 142 handles and encodes real-time data streams, including recording them and rendering them into the client user interface. For example, locally generated audio data, video data, and chat data typically are captured, encoded, and packetized into packets (e.g., RTP packets), which are sent out to the network 58.

If the available bandwidth is less than the required bandwidth (FIG. 12, block 242), the stream switching manager 168 checks the stream mix list 194 (see FIG. 8) to determine if a stream mix that provides the required real-time data stream data currently is being generated by the area server 64 (FIG. 12, block 246). If the needed stream mix is available, the stream switching manager 168 establishes with the area server 64 a connection over which a copy of the needed real-time data stream mix is transmitted from the area server 64 to the area client network node 52 (FIG. 12, block 248). If the needed stream mix is not available, the stream switching manager 168 sends a stream mix request to the area server 64 (FIG. 250, block 250).

In some embodiments, the area server 64 performs one or more of the functions of the area client stream switching manager 168. In these embodiments, the area server 64 establishes one or more real-time data stream connections between the network nodes 52-54, where the network nodes 52-56 are associated with respective objects each of which is associated with at least one of a source and a sink of one or more of the real-time data stream types. The area server 64 establishes the one or more real-time data stream connections based on the one or more switching rules, the respective sources and sinks associated with the objects, and respective positions of the objects in the virtual area in accordance with one or both of the methods of FIGS. 10 and 12.

2. Real-Time Data Stream Connections a. Introduction

In some embodiments, the connections between network nodes are established in two layers: links and channels.

A link is established between two network nodes anytime there is at least one stream for transmission directly from one node to another. Links typically are one-way and requested by the transmitter and accepted or rejected by the receiver. If rejected, communication may still be possible through links up and down (respectively) with an area server (either mixed or transceived, as described herein). The link represents the full bandwidth allocated by the two nodes for real-time communication. This allocation is dynamically determined based on overall network bandwidth available, the quantity of bandwidth desired at any given time, and the number of links. Adding and dropping links is an ongoing dynamic process. Movements within a complex area, or from area to area, are examples of when link connection and disconnection plays an important role in ongoing system behavior.

Each link is divided into channels that carry respective real-time data streams. Channels are allocated to particular streams within the overall bandwidth that has been allocated to the link. Channel bandwidth can be changed dynamically based on changes in overall link bandwidth and the number and priority of channels within the link. The activation or deactivation of channels provides information that may be used by the link layer of a network node to change the desired bandwidth between two nodes. This information may also be shared between nodes to establish the level of bandwidth allocated to the link.

The connection framework provided by these embodiments enables the transmitting and recipient network nodes to make dynamic decisions about how to use the available bandwidth for the set of streams that are needed at any given time between two nodes, in the context of the requirements for bandwidth amongst all of the links for each node. Reducing or increasing the bit rate for a voice channel while increasing or decreasing the amount of bandwidth dedicated to a simultaneous file transfer or a video feed are examples of this allocation decision making process. The connection framework also enables recipient network nodes to make decisions regarding server mixes versus individual stream transmission based on available channel bandwidth within a link.

System settings as optionally modified by the virtual area specification provide parameters for determining relative bandwidth allocations for links and channels and the priorities of stream types and topologies. Because of these variable and dynamic requirements, the up and down links between a network node and an area server (or other high bandwidth intermediary node) typically have high priority for local bandwidth because these links may be needed to transmit links and channels between various nodes. It is possible for a virtual area designer to create an virtual area that cannot be run by a given node because of bandwidth limitations at that node for links, channels or both.

Bandwidth is often the scarce resource (versus CPU time, hard disk space, graphic rendering capabilities, and so forth). The layering of node connections into links and channels within links enables virtual area designers, as well as system administrators, to have control over how any given node that is involved in one or more real-time sessions will respond when bandwidth is saturated. The layering allows individual links to be actively managed for minimum and maximum bandwidth. The layering also provides control over the selection of which nodes will receive a link (versus requiring a connection through an area server).

In one illustrative example, assume that a first network node and a second network node are communicating via a shared virtual area. Each of the first and second nodes requires a voice stream and a motion data stream from the other. To satisfy this need, each of the first and second nodes establishes with an area server a respective up-link, which is divided into a voice channel and a motion data channel. The area server tranceives the voice streams that it receives from the first and second network nodes and mixes the motion data streams that it receives from the first and second network nodes. The area server establishes respective down-links with the first and second network nodes and transmits the voice and motion data streams in voice and motion data channels allocated in the respective downlinks. While the first and second nodes are connected, they may engage in file transfer, which would then require a new channel in the link. If insufficient bandwidth is available for a reasonable data transfer rate, the sender could drop its bit rate down for a lower quality voice conversation, transceive the file transfer stream through the area server links, or otherwise adjust channels and links in accordance with either the logic in the respective system settings of the first and second network nodes or the behavior specified by the virtual area specification.

If a third network node requests entry into the virtual area, each of the first and second network nodes will require voice and motion data streams from the third network node and the third network node will require voice and motion data streams from each of the first and second network nodes, bandwidth permitting. If a minimum amount of bandwidth is not available to receive the required streams from the third network node directly, the first and second network nodes will either increase the up-link bandwidth to the area server, the down-link bandwidth from the server, or both. Alternatively, the first and second network nodes will need one or more server mixes. If there still is insufficient bandwidth to make all of the connections required by the virtual area specification, the third network node may be blocked from entering the virtual area, or one or both of the first and second nodes may be dropped from the real-time session, in which case the dropped network nodes may need to retry or connect via faster network connections.

Later, when the third network node leaves the virtual area, each of the first, second and third network nodes need to disconnect and release links and bandwidth allocated to connections with the first network node, which may cause the first and second network nodes to reallocate the available bandwidth to the links between themselves.

In some embodiments, the first and second network nodes have the ability to prioritize the links they have established with each other before allocating any bandwidth to the third network node. In some embodiments, the switching rules in the virtual area specification prioritize the connections. For example, in some virtual area designs, network nodes associated with certain role attributes (e.g., moderator) will have higher connection priority than other network nodes and therefore will always by allowed to link to the virtual area. In other virtual area designs, connections are ranked by their respective ages, with older connections ranked higher than younger connections. In these virtual areas, the nodes associated with the oldest connections will be the last to be dropped from the communication session.

b. Creating Links

Figure 13:
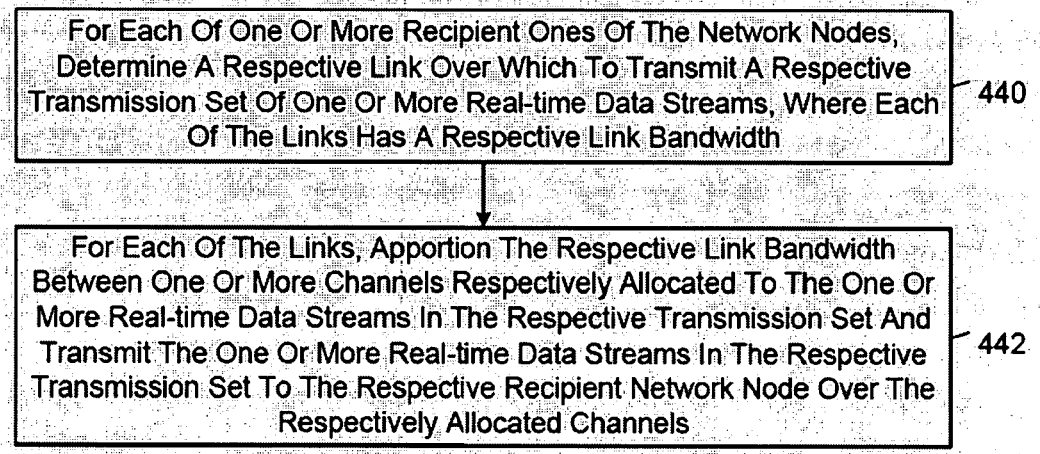
FIG. 13 is a flow diagram of an embodiment of a method of switching real-time data stream connections between network nodes sharing a virtual area.

FIG. 13 shows an exemplary embodiment of a method of switching real-time data stream connections between network nodes sharing a virtual area, where the links are established through links of the type described in the preceding section. The method of FIG. 13 typically is performed by the stream switching manager 168 of each of the network nodes that is a source of one or more of the real-time data streams that are required by other network nodes sharing the virtual area.

For each of one or more recipient network nodes, the stream switching manager 168 determines a respective link over which to transmit a respective transmission set of one or more real-time data streams, where each of the links has a respective link bandwidth (FIG. 13, block 440). Each of the links typically is a respective one-way link from a respective one of the transmitting network nodes to a respective one of the recipient network nodes. In some embodiments, however, one or more of the links may be two-way (e.g., half-duplex or full-duplex) links.

For each of the links, the stream switching manager 168 apportions the respective link bandwidth between one or more channels respectively allocated to the one or more real-time data streams in the respective transmission set and transmits the one or more real-time data streams in the respective transmission set to the respective recipient network node over the respectively allocated channels (FIG. 13, block 442). In some embodiments, the stream switching manager 168 allocates the respective bandwidth in an amount determined based on at least one attribute that is associated with the respective recipient network node. The attribute may correspond to any of the following exemplary attributes: a position in virtual area occupied by an avatar associated with the recipient network node; a link priority level associated with the recipient network node; and a role identifier assigned to an avatar associated with the recipient network node. In some embodiments, the apportioning of the respective link bandwidth is based on one or more stream priority levels respectively associated with the one or more real-time data streams in the respective transmission set.

In some embodiments, for each of the links, the stream switching manager 168 ascertains for each of the one or more real-time data streams in the respective transmission set one or more respective bandwidth levels and allocates the respective link bandwidth to the link based on the ascertained bandwidth levels. In some embodiments, the stream switching manager 168 ascertains these bandwidth levels by checking the system level settings of the transmitting network node and checking the virtual area specification for any bandwidth levels that are assigned to any stream types within any of the zones of the shared virtual area. Each real-time data stream type typically is associated with at least one system-level bandwidth level. For example, each of the area client network nodes typically includes a voice codec that provides different compression levels for voice streams and a video codec that provides different compression levels for video streams. Each of these codecs typically may be set to provide a respective range of compression levels from a default low (e.g., preferred or target) compression level to a high compression level. The virtual area specification may specify one or more area-specific bandwidth levels for each of one or more real-time data stream types. These levels may include a preferred bandwidth level, a minimum bandwidth level, and one or more bandwidth levels between the preferred and minimum bandwidth levels.

In some embodiments, for each of the links, the stream switching manager 168 identifies a respective minimum bandwidth level for each of the real-time data streams in the respective transmission set, and calculates a respective minimum link bandwidth level from the one or more identified respective minimum bandwidth levels. The stream switching manager 168 typically drops any of the links in response to a determination that bandwidth available to the link fails to meet the respective minimum link bandwidth level for a defined period of time.

In some embodiments, for each of the links, the stream switching manager 168 identifies at least two respective bandwidth levels in a respective preference hierarchy ordered from a respective first preferred bandwidth level (e.g., a default bandwidth level) to a respective second preferred bandwidth level (e.g., a minimum bandwidth level) for each of one or more of the real-time data streams in the respective transmission set. The stream switching manager 168 calculates a respective target link bandwidth level based at least in part on the identified first preferred bandwidth levels and calculates a respective fallback link bandwidth level based at least in part on the identified second preferred bandwidth levels. For each of the recipient network nodes, the stream switching manager 168 tries to establish the respective link to the recipient network node at the target link bandwidth level In this process, the stream switching manager 168 compares the target link bandwidth level to a current amount of bandwidth that is available to transmit the respective transmission set; the recipient network node also compares the target link bandwidth level to a current amount of bandwidth available to the receive the respective transmission set. In response to a failure to establish the respective link to the recipient network node at the target link bandwidth level, the stream switching manager 168 tries to establish the respective link to the recipient network node at the fallback link bandwidth level.

Figure 14:
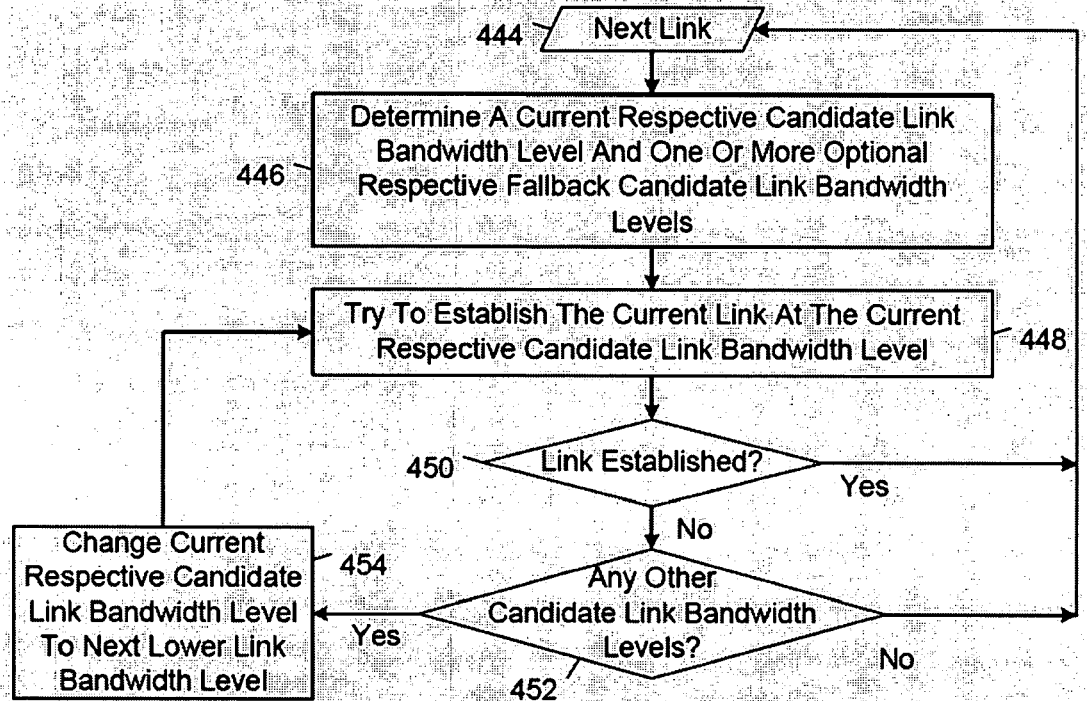
FIG. 14 is a flow diagram of an embodiment of a method of switching real-time data stream connections between network nodes sharing a virtual area.

FIG. 14 shows an exemplary implementation of the embodiments described in the preceding paragraph. In accordance with this embodiment, the stream switching manager 168 determines for each link (FIG. 14, block 444) a current respective candidate link bandwidth level and one or more optional respective fallback candidate link bandwidth levels (FIG. 14, block 446). The stream switching manager 448 tries to establish the current link at the current respective candidate link bandwidth level (FIG. 14, block 448). If the link is established (FIG. 14, block 450), the stream switching manager 168 processes the next link (FIG. 14, block 444). Otherwise, the stream switching manager 168 determines whether there are any other candidate link bandwidth levels available for the current link (FIG. 14, block 452). If so, the stream switching manager 168 changes the current respective candidate link bandwidth level to the next lower link bandwidth level (FIG. 14, block 454), and tries to establish the current link at the new candidate link bandwidth level (FIG. 14, block 448). If there are no more candidate link bandwidth levels (FIG. 14, block 452), the stream switching manager 168 reports an error for the current link and repeats the process for the next link (FIG. 14, block 444).

In response to the failure to establish any of the links, the recipient network nodes to which those links were directed may attempt to drop at least one optional real-time data stream in the transmission data set in an effort to accommodate existing bandwidth constraints. Alternatively, such recipient network nodes may attempt to establish links that provide the required real-time data stream data over respective network routes that are mediated by one or more of the other network nodes. For example, a recipient network node may request a link from the area server 64 that provides the required real-time data stream data in either an unmixed format or a mixed format.

In some embodiments, links may be secure. Secure links may have one or more of the following security properties: authentication, integrity and secrecy. Authenticated links use authentication techniques (such as evaluating certificates that are distributed as part of a public-key infrastructure, such as the one provided by Verisign) to help insure that each node is actually connecting to a known other node, rather than an imposter node. Integrity techniques (such as using secure hashing processes associated with the SHA algorithm) are employed to insure that any changes made to link contents between transmission and reception can be detected. Secrecy techniques (such as encrypting link contents with the AES encryption algorithm before transmission and decrypting link contents before use based on a shared key) help insure that the contents of a link cannot be readily understood by an eavesdropper. These techniques may be selectively combined to achieve the desired security properties for particular communication sessions. When secure links are employed, system settings and application design parameters may be adjusted to account for the additional overhead associated with establishing secure links. For example, a link may be held at low (or even zero) bandwidth for a longer time in order to avoid the need to reestablish the link if bandwidth becomes available.

c. Exemplary Embodiments having Enhanced Link Management Functions

The enhanced link management functionalities of the stream switching manager 168 that are described in §V.D.2 may be implemented in any computing or data processing environment, including in digital electronic circuitry (e.g., an application-specific integrated circuit, such as a digital signal processor (DSP)) or in computer hardware, firmware, device driver, or software. In some embodiments, these functionalities are implemented in a dedicated hardware module, such as a network adapter and a network switch. Embodiments of such modules may be configured to provide accelerated performance of any of the following enhanced link management functions: link creation; link routing; bandwidth allocation between multiple links transmitted from a given network node; and management of bandwidth between channels within a given link.

Figure 15:
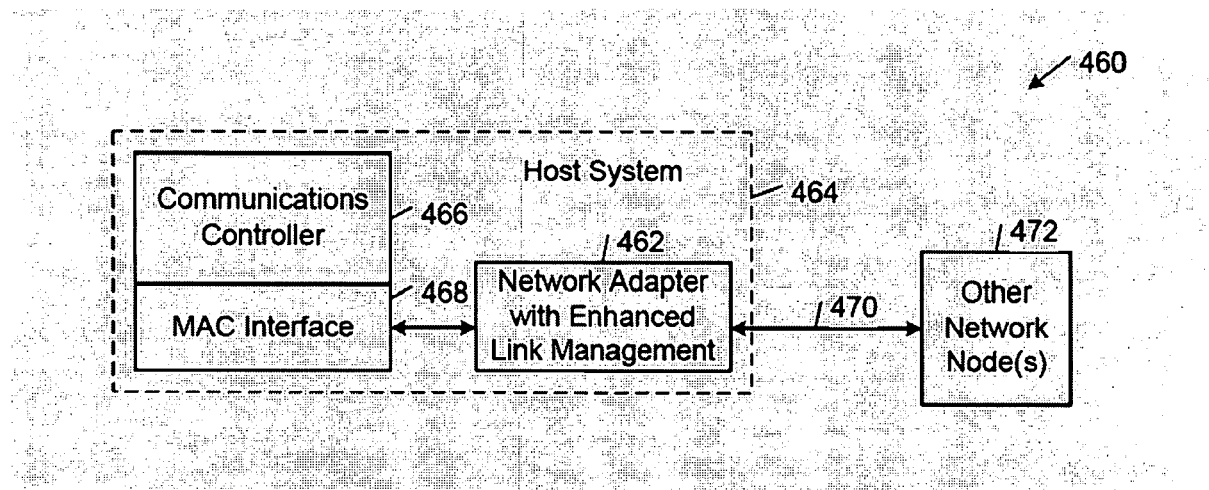
FIG. 15 is block diagram of a host system that includes a network adapter with enhanced link management functions.

FIG. 15 shows an exemplary application environment 460 in which a network adapter 462 with enhanced link management functions may operate. The network adapter 462 is incorporated within a host system 464, which includes a communications controller 466 and a medium access control (MAC) interface 468. The network adapter 462 transitions between the host system 464 and a network medium 470. The network medium 470 is the physical medium over or through which the links from the host system 464 to one or more other network nodes 472 are established. Wire, fiber and electromagnetic waves in free space are three exemplary types of network media.

Each of the host system 464 and the other network nodes 472 may be any type of device or system that connects to a network (e.g., a personal computer, a computer workstation, a network switch, a network hub, and a network repeater). The host communications controller 466 enables the host system 464 to share access to the network medium 470. The MAC interface 468 connects the communications controller 466 to the network adapter 462. One exemplary type of MAC interface is the media independent interface (MII), which provides a parallel interface supporting communications with a parallel communications controller 466. Another exemplary type of MAC interface is the IEEE 802.03 compliant general purpose serial interface (GPSI), which supports serial communications with a serial communications controller 466.

Figure 16:
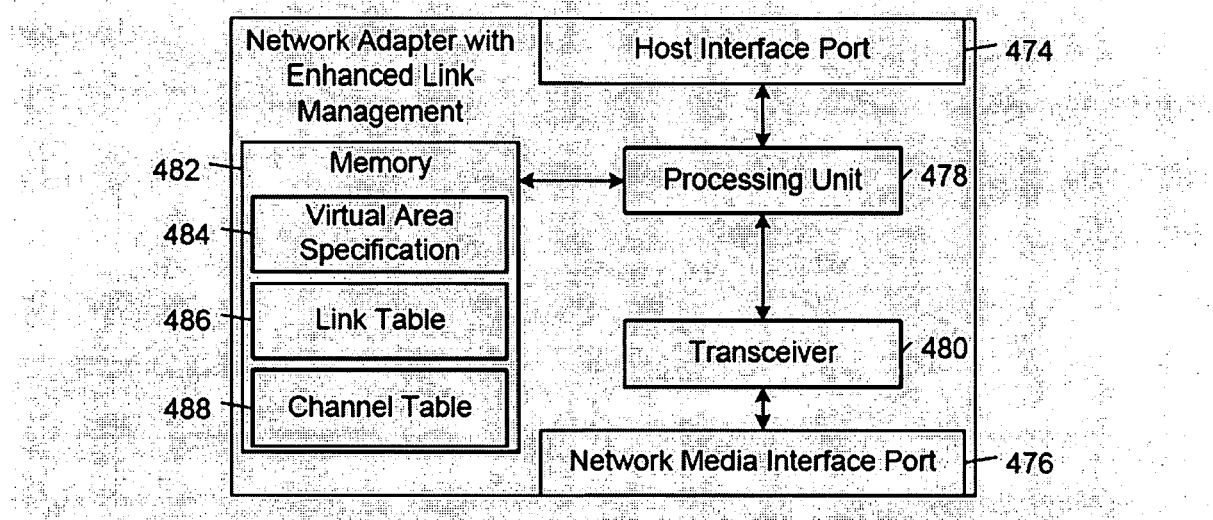
FIG. 16 is a block diagram of an embodiment of the network adapter shown in FIG. 15.

FIG. 16 shows an embodiment of the network adapter 462 that includes a host interface port 474, a network media interface port 476, a processing unit 478, a transceiver 480, and a memory 482. The host interface port 474 is connectable to MAC interface 468. The network medium interface port 476 is connectable to the network medium 470. In the illustrated embodiments, the network interface port 476 provides a physical interface between the transceiver 480 and the network medium 470.

The processing unit 478 typically is a MAC processing unit that performs MAC layer functions, including, but are not limited to, ensuring that the host system 464 and the one or more other network nodes 472 communicate with the correct frame format and protocol. In addition, the processing unit 478 is operable to perform the link and channel management functions that are described in §V.D.2. To assist in the performance of these functions, the processing unit 478 stores in the memory 482 a copy 484 of the virtual area specification, a link table 486, and a channel table 488. As explained herein, the virtual area specification 484 may contain any of the following parameter values that influence the management of links and channels: preferred, minimum, and intermediate bandwidth levels by stream type; stream type priorities; stream handling topology priorities; and role identifiers assigned to objects (e.g., avatars) that are associated with the network nodes sharing a virtual area. The link table 486 contains a list of the current links that are established with the other network nodes 472, as well as the allocation of bandwidth between the current links. The channel table 488 contains for each of the current links a list of the respective channels that are allocated to the real-time data streams transmitted over the link, as well as the allocation of bandwidth between the respective channels within the link.

3. Managing Real-Time Data Stream Connections

Figure 17:
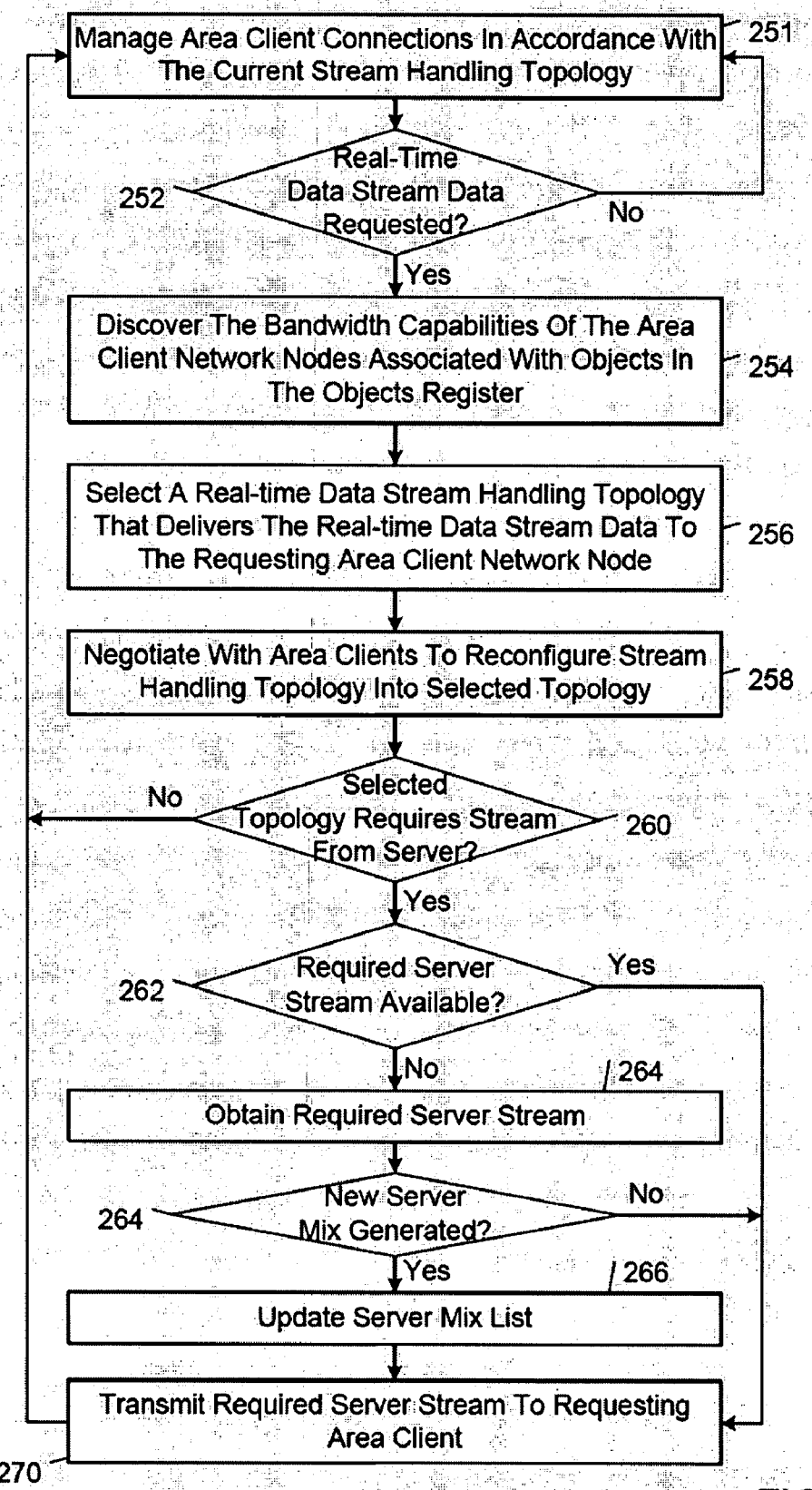
FIG. 17 is a flow diagram of an embodiment of a method of determining one or more real-time data stream handling topologies that deliver required data stream data to an area client network node

FIG. 17 shows an embodiment of a method of determining real-time data stream connections that deliver the required data stream data to an area client network node. In this process, the area server 64 determines an optimal stream handling topology that provides the required real-time data stream data to the area client network node 52.

The area server 64 manages the connections between the area client network nodes in accordance with the current stream handling topology (FIG. 17, block 251). In this regard, the area server 64 maintains global state data including a definition of the virtual area and current object state data for all avatars and other objects in the virtual area. In this process, the area server 64 tracks the objects in the virtual area and, in some embodiments, the area server 64 maintains recent history data cache, which is used for real-time synchronization of the area client network nodes. The area server 64 also reevaluates connections in response to object entry into the virtual area, object exit from the virtual area, and bandwidth fault.

In response to receipt of a request for real-time data stream data from a requesting area client network node (FIG. 17, block 262), the area server 64 discovers the bandwidth capabilities of the area client network nodes that are associated with objects in the objects register 190 (see FIG. 8) (FIG. 17, block 254). In some embodiments, each of the area client network nodes either dynamically or periodically transmits its current upload bandwidth capacity and its current download bandwidth capacity to the area server 64.

The area server 64 selects a real-time data stream handling topology that delivers the real-time data stream data to the requesting area client network node (FIG. 17, block 256). The area server 64 typically selects a topology based on the discovered bandwidth capabilities of the area client network nodes. In some embodiments, the area server 64 selects a stream handling topology in which the requesting network node and the other network nodes receive a maximal number of unmixed real-time data streams. Such unmixed real-time data streams enable the area client network nodes to render the streams with higher quality and with the option of applying local processing (e.g., one or both of audio stereo pan processing or fader envelope processing to more realistically place avatars in a stereo soundscape) to the streams to achieve a more immersive experience or particular application objective (e.g. 5.1 audio handling or specialized avatar motions).

In some embodiments, the virtual area specification specifies stream attribute values for one or more real-time data stream types in one or more zones of the virtual area. In these embodiments, the area server 64 selects a stream handling topology based on the one or more stream attribute values specified by the virtual area specification. In some exemplary virtual area designs, the virtual area specification assigns a first stream priority attribute value to a first real-time data stream type and assigns to a second real-time data stream type a second stream priority attribute value different from the first stream priority attribute value. For example, in the second COLLADA Streams Reference example described above, the voice streams sourced from the StageZone and associated with the "lead_singer" role attribute are assigned a priority level of 1, whereas voice streams sourced from the Audience Zone are associated with a priority level of 2. With respect to these types of virtual area design specifications, the area server 64 attempts to select stream handling topologies that prioritize the first and second real-time data stream types differently in accordance with the different first and second stream priority attribute values. For example, with respect to the second COLLADA Streams Reference example, faced with bandwidth availability constraints, the area server 64 would create and transmit stream mixes for the voice streams sourced from the Audience Zone before creating and transmitting stream mixes for the lead_singer voice streams sourced from the StageZone.

In some exemplary area designs, the virtual area specification assigns a first stream topology attribute value to a first real-time data stream type and assigns to a second real-time data stream type a second stream topology attribute value different from the first stream topology attribute value. For example, in the second COLLADA Streams Reference example described above, the voice streams sourced from the StageZone and associated with the lead_singer role attribute are assigned a topology attribute value of "direct", whereas the chat streams sourced from the AudienceZone are associated with a topology attribute value of "server_mix". With respect to these types of virtual area design specifications, the area server 64 attempts to select different stream handling topologies for the first and second real-time data stream types in accordance with the different first and second stream topology attribute values. For example, in some cases, the area server 64 selects for the first real-time data stream type a stream handling topology that delivers ones of the real-time data streams of the first type to one or more of the given network node and the other network nodes in a mixed stream format (e.g., the chat streams sourced from the AudienceZone in the second COLLADA Streams Reference example), and selects for the second real-time data stream type a stream handling topology that delivers ones of the real-time data streams of the second type to one or more of the given network node and the other network nodes in an unmixed stream format (e.g., the voice streams sourced from the StageZone and associated with the lead-singer role attribute in the second COLLADA Streams Reference example).

The area server 64 negotiates with the area clients to reconfigure the stream handling topology into the selected topology (FIG. 17, block 258). In this process, the area server 64 negotiates with the area clients to establish a set of connections between the area clients and optionally the area server 64 that deliver the required data stream data to the requesting area client network node. In some cases, the area server 64 sends respective requests to the area clients for one or more real-time data streams that will either be relayed to the requesting area client node or combined with other real-time data streams into a stream mix that will be delivered the required real-time data stream data to the requesting area client network node.

If the selected topology does not require a stream from the area server 64 (FIG. 17, block 260), the area server 64 manages the connections between the area client network nodes in accordance with the current stream handling topology (FIG. 17, block 251). For example, in some cases (see, e.g., FIG. 22), the selected topology delivers the required real-time data stream data to the requesting area client network node directly from one or more of the area client network nodes, obviating the need for the area server 64 to transmit that data.

If the selected topology does require a stream from the area server 64 (FIG. 17, block 260), the area determines from the stream mix list 184 (see FIG. 8) whether the required server stream is available (i.e., currently is being generated) (FIG. 17, block 262). The required server stream may be in the form of a copy of a real-time data stream that is sourced by one of the other area client network nodes or in the form of a stream mix that currently is being produced from two or more real-time data streams that the area server 64 is receiving from ones of the area client network nodes other than the requesting area client network node. If the required stream is available (FIG. 17, block 262), the area server 64 transmits a copy of the required server stream to the requesting area client network node (FIG. 17, block 270), and manages the area client connections in accordance with the current stream handling topology (FIG. 17, block 251).

If the required stream is not available (FIG. 17, block 262), the area server 64 obtains the required server stream (FIG. 17, block 264). In this process, the area server 64 may generate a copy of a real-time data stream that is received from one of the other area client network nodes or it may generate a stream mix from two or more real-time data streams that are received from ones of the area client network nodes other than the requesting area client network node. If a new stream mix is generated (FIG. 17, block 266), the area server 64 updates the stream mix list 184 (FIG. 17, block 268), transmits the required server stream to the requesting area client (FIG. 17, block 270), and manages the area client connections in accordance with the current stream handling topology (FIG. 17, block 251). If a new stream mix is not generated (FIG. 17, block 266), the area server 64 transmits the required server stream to the requesting area client (FIG. 17, block 270), and manages the area client connections in accordance with the current stream handling topology (FIG. 17, block 251).

4. Exemplary Real-Time Data Stream Handling Topologies

This section describes exemplary ones of the stream handling topologies that are selectable by the area server 64 in block 256 of the method shown in FIG. 17.

a. Exemplary Server Mixing Stream Handling Topology

Figure 18:
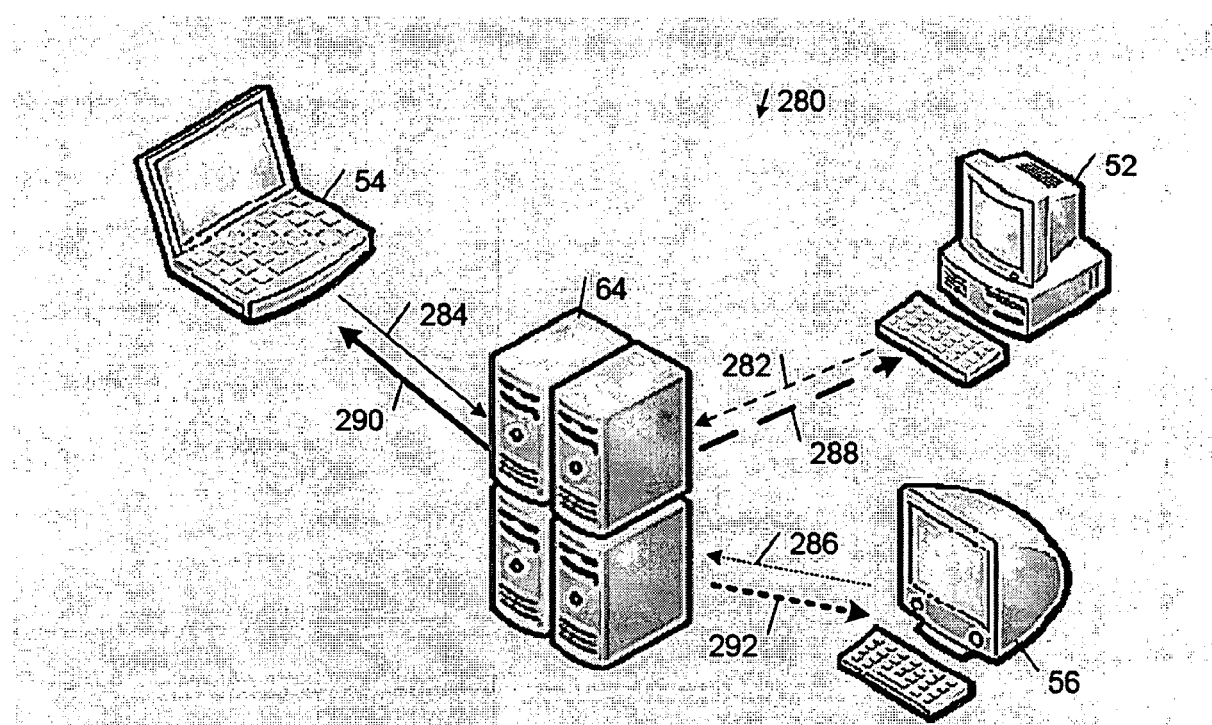
FIG. 18 is a diagrammatic view of an embodiment of a real-time data stream handling topology.

FIG. 18 shows an embodiment of a real-time data stream handling topology 280 in which the area server 64 receives real-time data stream sets 282, 284, 286 from the area client network nodes 52-56, respectively. These data stream sets 282-286 include all the real-time data streams that are required to connect the objects in a shared virtual area in accordance with the virtual area specification and their positions. Each of these streams is packetized into packets by the area clients 52-56. Each packet includes a header that contains a source identifier field that identifies the source of the packet, a sequencing number, and other information.

The area server 64 generates from the received data stream sets 282-286 respective sets 288, 290, 292 of stream mixes, where each set 288-292 includes the real-time data stream types (e.g., audio, video, chat, and motion data) that are required by a respective one of the area client nodes 52-56. In this process, the area server 64 separates the incoming real-time data stream packets by type (e.g., video, audio, chat, motion data, and control) and by the source identifier, and reassembles the packets by sequence number. The area server 64 then combines the streams of the same type into a respective one of the stream mixes and transmits the respective sets 228-292 of stream mixes to a respective one of the area client network nodes 52-56.

Figure 19:
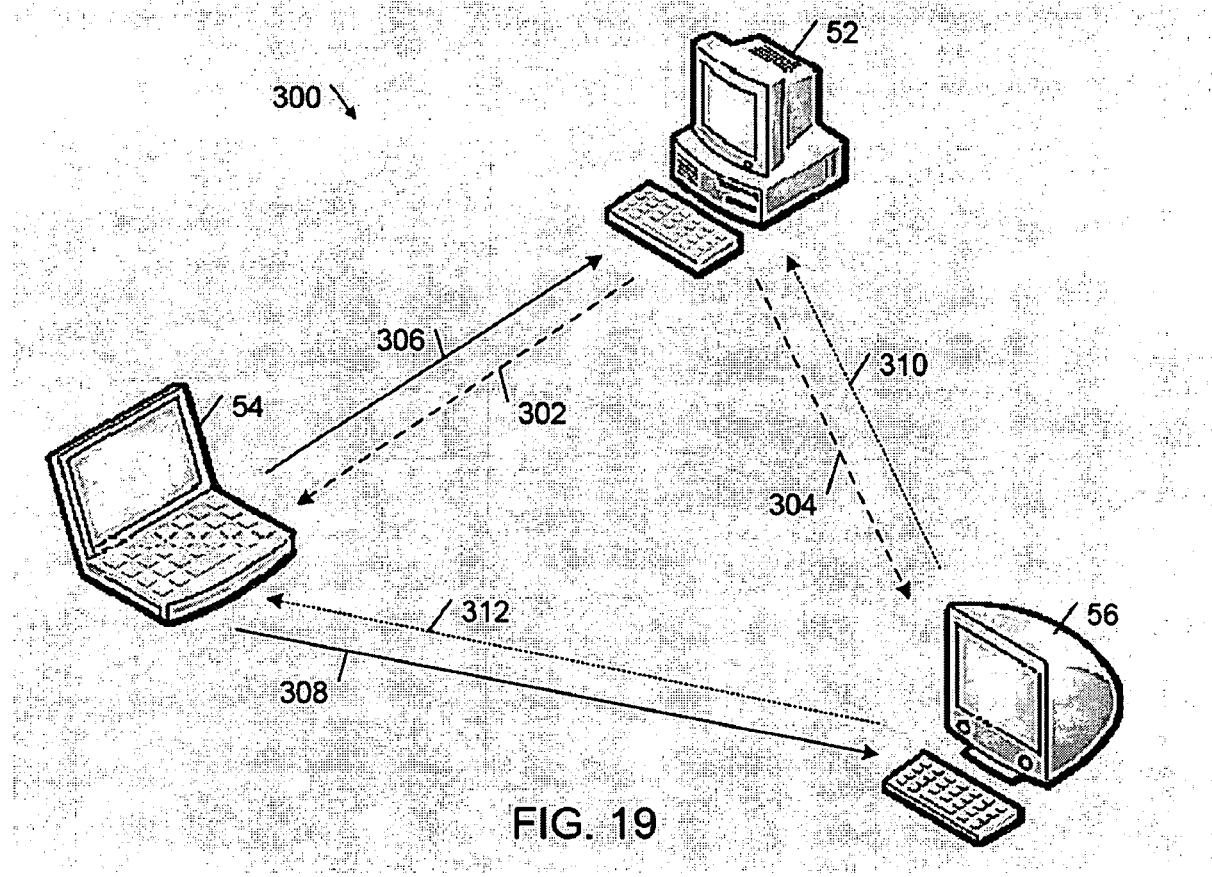
FIG. 19 is a diagrammatic view of an embodiment of a real-time data stream handling topology.

As compared to the peer-to-peer topology shown in FIG. 19, the topology 280 reduces the number of network connections that are required for each area client, thereby reducing the load on each area client and their network; the load on the area server 64, however, is increased.

b. Exemplary Peer-to-Peer Client Mixing Stream Handling Topology

FIG. 19 shows an embodiment of a peer-to-peer real-time data stream handling topology 300 in which each of the area client network nodes 52-56 transmits a respective copy of each of the required real-time data streams to each of the other ones of the area client network nodes 52-56. Thus, in the example illustrated in FIG. 19, the area client 52 transmits a first set 302 of streams to the area client 54 and a second set 304 of streams to the area client 56; the area client 54 transmits a first set 306 of streams to the area client 52 and a second set 308 of streams to the area client 56; and the area client 56 transmits a first set 310 of streams to the area client 52 and a second set 312 of streams to the area client 54. These streams 302-312 include all the real-time data streams that are required to connect the objects in the shared virtual area in accordance with the virtual area specification and their positions. Each of the streams is packetized into packets, each of which includes a header that contains a source identifier field that identifies the source of the packet, a sequencing number, and other information.

Each of the area client network nodes 52-56 generates a respective stream mix from the real-time data streams that are received from the other area client network nodes for each required real-time data stream type (e.g., audio, video, chat, and motion data). In this process, each area client separates the incoming real-time data stream packets by type (e.g., video, audio, chat, motion data, and control) and by the source identifier and reassembles the packets by sequence number. Each area client then sequences the reassembled packet stream by correlated timestamps and source ID to maintain synchronization between the real-time data streams during rendering.

The scalability of the topology 300 is constrained by the heavy upload requirements on the area client network nodes. The topology 300 also places a heavy load on the network when unicast transmissions are used to send the required real-time data stream, as shown in FIG. 19. In some embodiments, the local network load is lightened by configuring each of the area client network nodes 52-56 to send a single respective multicast transmission of each of the required data streams to one or more switches that distribute copies of the multicast stream to the other network nodes.

c. Exemplary Peer-to-Peer Client Mixing Stream Handling Topology

Figure 20:
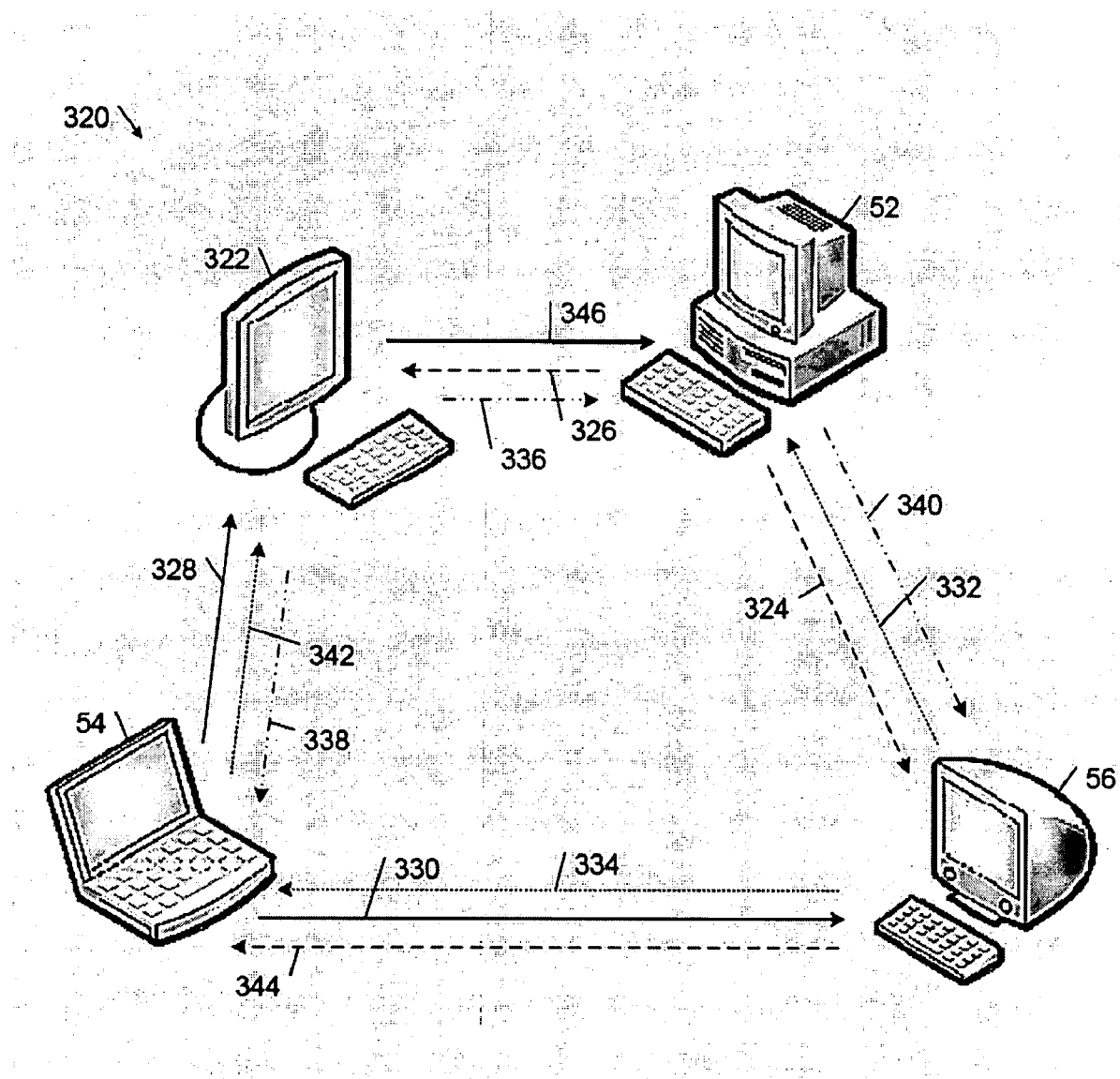
FIG. 20 is a diagrammatic view of an embodiment of a real-time data stream handling topology.

FIG. 20 shows an embodiment of a peer-to-peer real-time data stream handling topology 320 that minimizes connections between four area client network nodes 52-56 and 322. In the topology 320, each of the area client network nodes 52-56, 322 transmits a respective copy of each of the required real-time data streams to two other ones of the area client network nodes 52-56, 322. Thus, in the example illustrated in FIG. 20, the area client 52 transmits a first set 324 of streams to the area client 56 and a second set 326 of streams to the area client 322; the area client 54 transmits a first set 328 of streams to the area client 322 and a second set 330 of streams to the area client 56; the area client 56 transmits a first set 332 of streams to the area client 52 and a second set 334 of streams to the area client 54; and the area client 322 transmits a first set 336 of streams to the area client 52 and a second set 338 of streams to the area client 54. In addition, each of the area clients 52-56, 322 serves as a transceiver switch that relays a set of real-time data streams that is received from one of the other area clients to another one of the area clients. In particular, the area client 52 relays a copy 340 of the set 336 of streams from area client 322 to area client 56; the area client 54 relays a copy 342 of the set 334 of streams from area client 56 to area client 322; the area client 56 relays a copy 344 of the set 324 of streams from area client 52 to area client 54; and the area client 322 relays a copy 346 of the set 328 of streams from area client 54 to area client 52. These stream sets 324-346 include all the real-time data streams that are required to connect the objects in the shared virtual area in accordance with the virtual area specification and their positions. Each of these streams is packetized into packets, each of which includes a header that contains a source identifier field that identifies the source of the packet, a sequencing number, and other information.

Each of the area client network nodes 52-56, 322 generates a respective stream mix from the real-time data streams that are received from the other area client network nodes for each required real-time data stream type (e.g., audio, video, chat, and motion data). In this process, each area client separates the incoming real-time data stream packets by type (e.g., video, audio, chat, motion data, and control) and by the source identifier and reassembles the packets by sequence number. Each area client then sequences the reassembled packet stream by correlated timestamps and source ID to maintain synchronization between the real-time data streams during rendering.

The scalability of the topology 320 is constrained by the heavy upload requirements on the area client network nodes. The topology 320 also places a heavy load on the network when unicast transmissions are used to send the required real-time data stream, as shown in FIG. 20. In some embodiments, the local network load is reduced by configuring each of the area client network nodes 52-56, 322 to send a single respective multicast transmission of each of the duplicated required data streams to one or more switches that distribute copies of the multicast stream to the other network nodes.

d. Exemplary Sever-Mediated Client Mixing Stream Handling Topology

Figure 21:
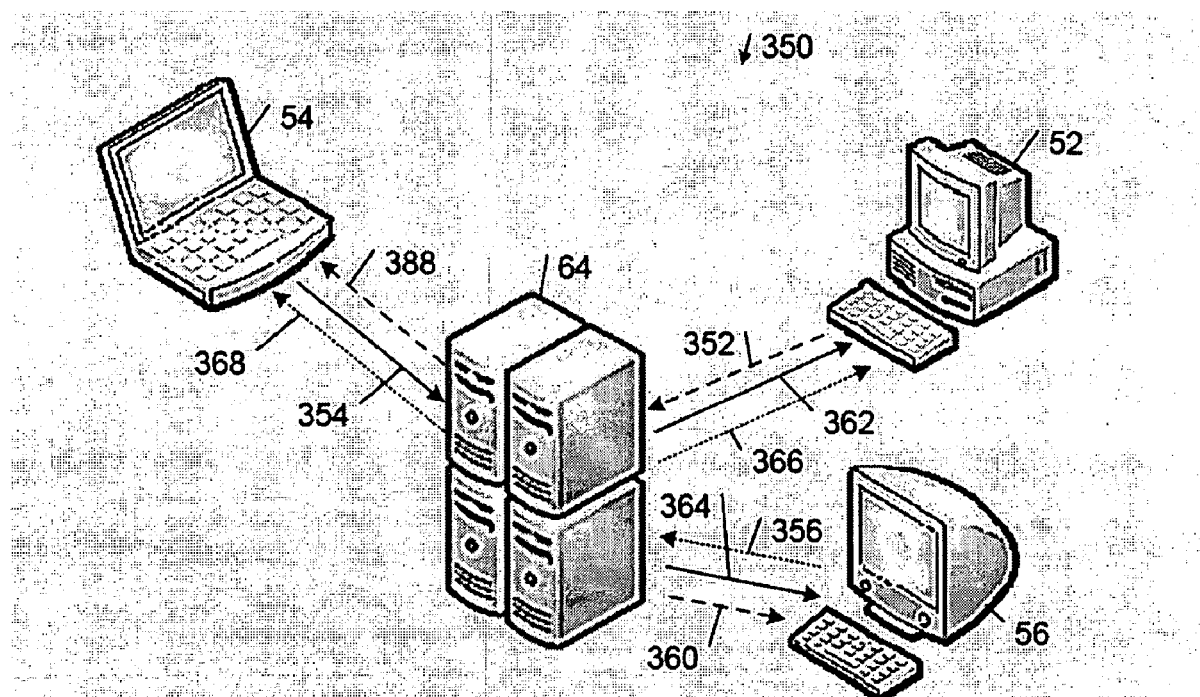
FIG. 21 is a diagrammatic view of an embodiment of a real-time data stream handling topology.

FIG. 21 shows an embodiment of a sever-mediated real-time data stream handling topology 350 in which the area server 64 serves as a transceiver switch that relays real-time data streams between the area client network nodes 52-56. In the topology 350, each of the area client network nodes 52-56 uploads a respective set 352, 354, 356 of required real-time data streams to the area server 64, which relays required copies of the uploaded streams to the area client network nodes 52-56 in accordance with their respective requirements. Thus, in the example illustrated in FIG. 21, the area server 64 transmits a respective copy 358, 360 of the stream set 352 uploaded by area client 52 to each of the other area clients 54, 56; the area server 64 transmits a respective copy 362, 364 of the stream set 354 uploaded by area client 54 to each of the other area clients 52, 56; and the area server 64 transmits a respective copy 366, 368 of the stream set 356 uploaded by area client 56 to each of the other area clients 52, 54. The stream sets 358-368 include all the real-time data streams that are required to connect the objects in the shared virtual area in accordance with the virtual area specification and their positions. Each of these streams is packetized into packets, each of which includes a header that contains a source identifier field that identifies the source of the packet, a sequencing number, and other information.

Each of the area client network nodes 52-56 generates a respective stream mix from the real-time data streams that are received from the area server network node 64 for each required real-time data stream type (e.g., audio, video, chat, and motion data). In this process, each area client separates the incoming real-time data stream packets by type (e.g., video, audio, chat, motion data, and control) and by the source identifier and reassembles the packets by sequence number. Each area client then sequences the reassembled packet stream by correlated timestamps and source ID to maintain synchronization between the real-time data streams during rendering.

e. Exemplary Dynamic Stream Handling Topology

In some embodiments, the area server 64 dynamically determines a real-time data stream handling topology that delivers a specified set of real-time data streams to a given network node. In this process, the area server 64 selects as the stream handling topology a topology that involves switching real-time data streams between ones of the network nodes in a first set through a central network node and switching real-time data streams over direct peer-to-peer network connections between ones of the network nodes in a second set. The first set of nodes may be different from the second set of nodes. As explained above, each of the network nodes has at least one object associated with a respective position in the virtual area and at least one of a source and a sink of one or more of the real-time data stream types. The area server 64 forwards real-time data stream packets between the network nodes in the first set based on the one or more switching rules and the determined real-time data stream handling topology.

Figure 22:
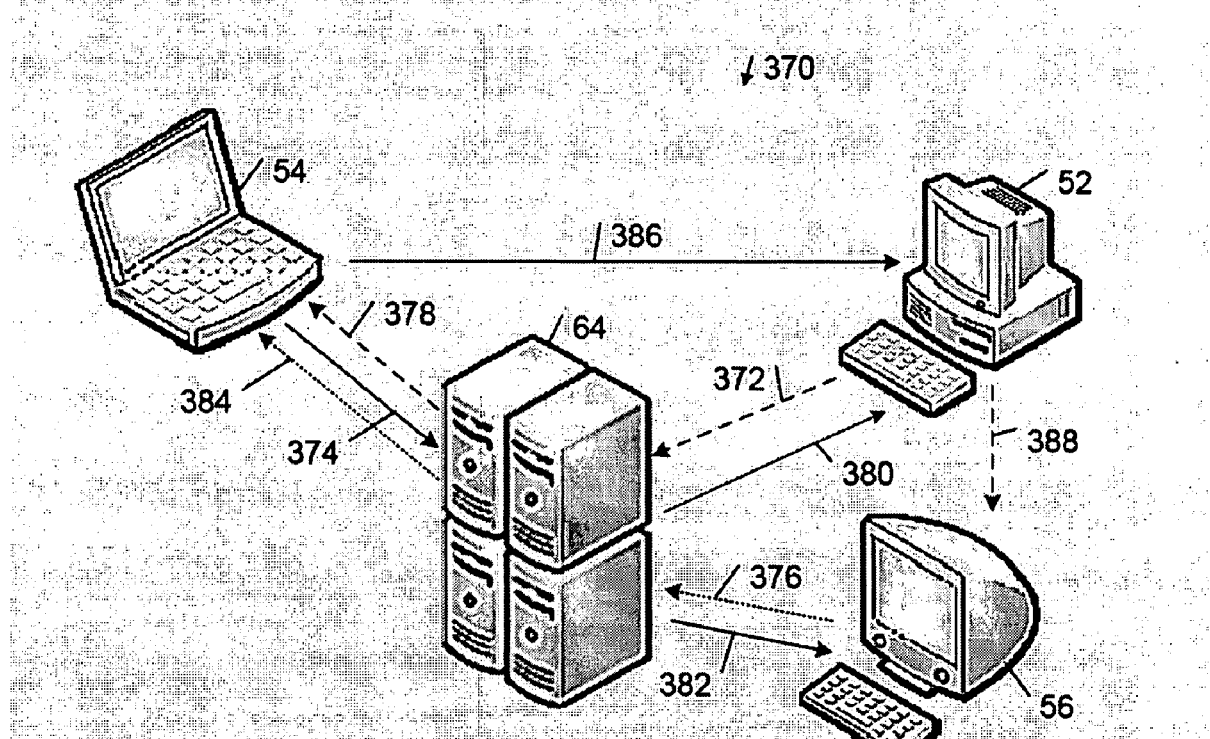
FIG. 22 is a diagrammatic view of an embodiment of a real-time data stream handling topology.

FIG. 22 shows an embodiment of a real-time data stream handling topology 370 that dynamically combines elements of the stream handling topologies described above. In particular, in the exemplary topology shown in FIG. 22, the area client network nodes 52-56 receive the required real-time data streams through a dynamic combination of peer-to-peer connections and server-mediated connections in which the area server 64 acts a transceiver switch between area client network nodes, as necessary.

In the topology 370, each of the area client network nodes 52-56 uploads a respective set 372, 374, 376 of required real-time data streams to the area server 64. In the example illustrated in FIG. 22, the area server 64 relays a copy 378 of the stream set 372 that was uploaded by the area client 52 to the area client 54; the area server 64 relays a respective copy 380, 382 of the stream set 374 that was uploaded by area client 54 to each of the other area clients 52, 56; and the area server 64 relays a copy 384 of the stream set 376 that was uploaded by the area client 56 to the area client 54. In addition, the area client 52 receives the required stream set 386 directly from the area client 54, and the area client 56 receives the required stream set 388 directly from the area client 52. The stream sets 378-388 include all the real-time data streams that are required to connect the objects in the shared virtual area in accordance with the virtual area specification and their positions. Each of these streams is packetized into packets, each of which includes a header that contains a source identifier field that identifies the source of the packet, a sequencing number, and other information.

Each of the area client network nodes 52-56 generates a respective stream mix from the real-time data streams that are received from the other area client network nodes for each required real-time data stream type (e.g., audio, video, chat, and motion data). In this process, each area client separates the incoming real-time data stream packets by type (e.g., video, audio, chat, motion data, and control) and by the source identifier and reassembles the packets by sequence number. Each area client then sequences the reassembled packet stream by correlated timestamps and source ID to maintain synchronization between the real-time data streams during rendering.

The topology 370 enables the bandwidth that is available on the area client network nodes 52-56 to be optimized so that the area client network nodes 52-56 receive a maximal number of unmixed real-time data streams.

VII. Second System Architecture Embodiment

Figure 23:
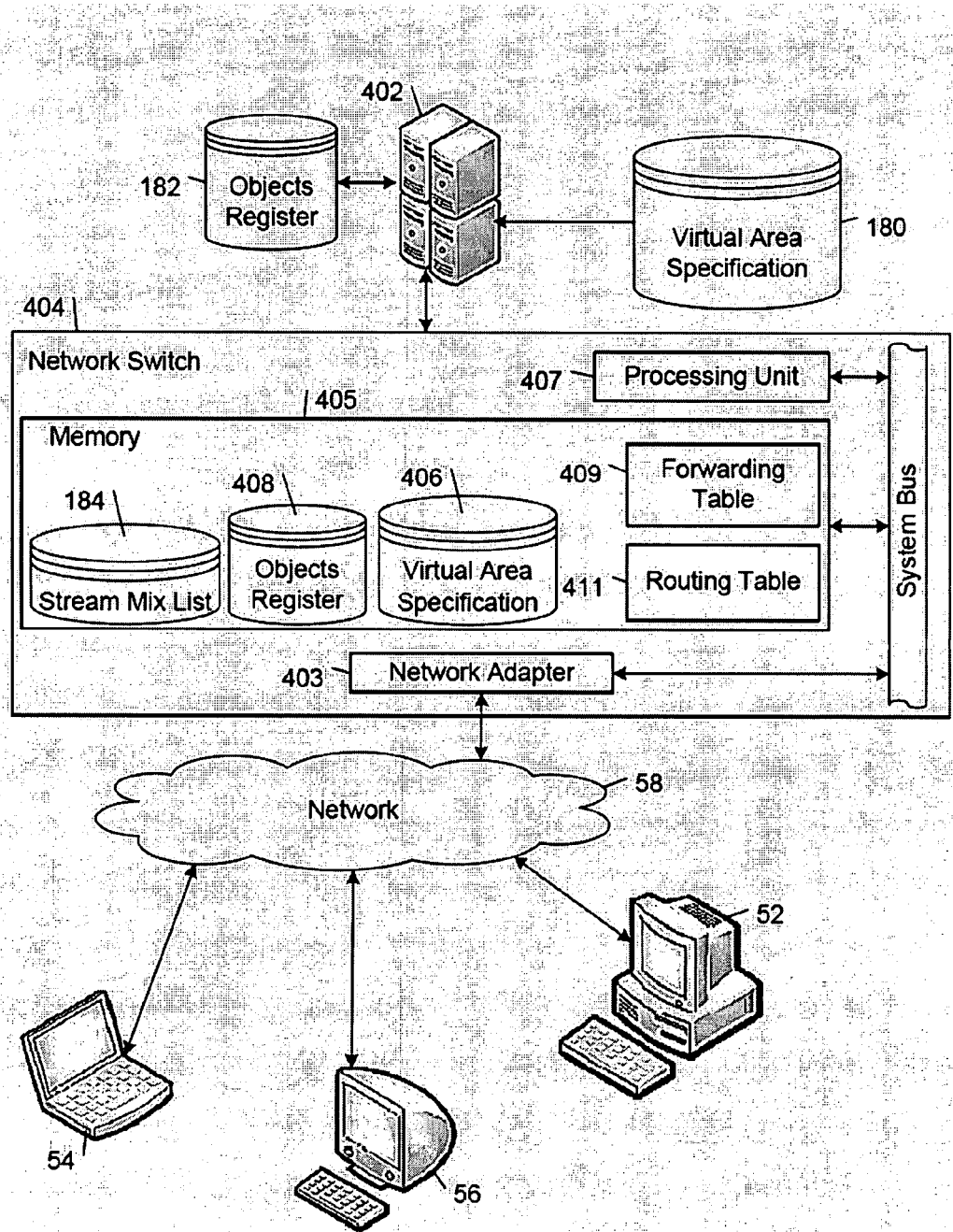
FIG. 23 is a block diagram of an embodiment of a shared virtual area communication environment that includes an embodiment of a network switch that manages real-time data stream connections in accordance with switching rules defined in a virtual area specification.

FIG. 23 shows an embodiment of a shared virtual area communication environment 400 that includes the area client network nodes 52-56, an embodiment 402 of the area server network node 64, and a network switch 404. The structure and operation of the elements of the shared virtual area communication environment 400 are the same as the structure and operation of the elements of the shared time data stream switching functionalities of at least one of the area server 64 and the client communication application 142 (see FIG. 7) have been incorporated into the network switch 404, enabling the network switch 404 to perform automated real-time data stream switching in accordance with one or more of the methods described above.

The network switch 404 is a computer networking device that includes a memory 405, a processing unit 407 that includes at least one computer processor, and a network adapter 403 through which the network switch 404 connects to the area client network nodes 54, 56 and the area server 402. In operation, the network switch 404 connects network segments by inspecting data packets, determining the source of the packets, and forwarding the packets to their respective destinations. For each packet, the network switch compares the destination and source hardware addresses to a table of network segments and addresses. If the segments are the same, the packet is dropped; otherwise, the network switch 404 forwards the packet to the proper segment. The network switch 404 typically determines the network destination to which the packet is forwarded based on a forwarding table 409, which contains preferred routes for packet forwarding. The network switch 404 typically generates the forwarding table 409 by applying a routing algorithm to a routing table 411, which contains routes to network destinations in the vicinity of the network switch 404. The routes in the forwarding table 409 and the routing table 411 typically are specified by information describing the network topology between the network switch 404 and the network destinations. The network switch 404 does not forward bad or misaligned packets. The network switch 404 may operate at one or more of the OSI layers, including the physical layer, the data link layer, the network layer, and the transport layer. Exemplary implementations of the network switch 404 include, but are not limited to, network switches, network routers, and network hubs.

In some embodiments, the network switch 404 switches real-time data stream connections between network nodes sharing a virtual area. The network adapter 403 receives a virtual area specification 406 from the area server 402. The virtual area specification 406 includes a description of one or more switching rules each defining a respective connection between sources of a respective real-time data stream type and sinks of the real-time data stream type in terms of positions in the virtual area. The computer readable memory 405 stores the virtual area specification 406 and one or both of the routing table 411 and the forwarding table 409, where each of the tables 409, 411 includes network topology information describing routes to network destinations. The processing unit 407 forwards real-time data stream packets between two or more of the network nodes 52-56, where each of the network nodes 52-56 is associated with a respective position in the virtual area and at least one of a source and a sink of one or more of the real-time data stream types. The processing unit 407 forwards the one or more real-time data stream packets based on the network topology information and the one or more switching rules.

In some embodiments, the network switch performs one or more of the functions of the area client stream switching manager 168. In these embodiments, the processing unit 407 establishes one or more real-time data stream connections between the network nodes 52-54, where the network nodes 52-56 are associated with respective objects each of which is associated with at least one of a source and a sink of one or more of the real-time data stream types. The processing unit 407 establishes the one or more real-time data stream connections based on the one or more switching rules, the respective sources and sinks associated with the objects, and respective positions of the objects in the virtual area in accordance with one or both of the methods of FIGS. 10 and 12-14.

In some embodiments, the network switch 404 performs one or more of the functions of an area server network node. In particular, the network switch 404 performs some or all of the real-time data stream switching functions of the area server 64 (see, e.g., FIG. 8). In this regard, the network switch 404 receives configuration data from the area server 64. The configuration data includes a copy of the virtual area specification 180 (see FIG. 8) and a copy of the objects register 182 (see FIG. 8). The network switch 404 initializes a local virtual area specification cache 406 with the copy of the virtual area specification 180 and initializes a local objects register 408 with the copy of the objects register 182. Periodically, in response to events (e.g., avatar movement), or both periodically and in response to events, the network switch 404 updates the local objects register 408 with information obtained from tracking the communicants' avatars and other objects that enter, leave, and move around in the virtual area based on motion data received from the area clients 52-56. The network switch 404 determines the real-time data stream connections that deliver the required data stream data to the area client network nodes 52-56 in accordance with the method of FIG. 17. This process includes determining an optimal stream handling topology that provides the required real-time data stream data to the area client network nodes 52-56.

In some embodiments, the network switch 404 dynamically determines a real-time data stream handling topology that delivers a specified set of real-time data streams to a given network node. In this process, the processing unit 407 selects as the stream handling topology a topology that involves switching real-time data streams between ones of the network nodes in a first set through a central network node and switching real-time data streams over direct peer-to-peer network connections between ones of the network nodes in a second set (which typically is different from the first set). As explained above, each of the network nodes is associated with a respective position in the virtual area and at least one of a source and a sink of one or more of the real-time data stream types. The processing unit 407 forwards real-time data stream packets between the network nodes in the first set based on the one or more switching rules and the determined real-time data stream handling topology.

VIII. Conclusion

The embodiments that are described herein provide systems and methods of switching real-time data stream connections in a shared virtual area communication environment. These embodiments enable switching rules for connecting real-time data streams between network nodes communicating through a shared virtual area to be tied explicitly to the specification of the virtual area. These embodiments allow a designer of the virtual area to control not only the shape and appearance of the virtual area, but also the way in which communicants connect to one another through real-time data streams. In addition, by tying automatic switching rules to locations in the virtual area, these embodiments reduce the complexity involved in connecting and disconnecting communicant nodes and increases the scalability of the system as compared to systems that establish and terminate connections based on attributes and properties of objects within a virtual space, and systems that intertwine signal processing functions with stream routing, connection and disconnection functions.

Other embodiments are within the scope of the claims.

What is claimed is:

1. A method of switching real-time data stream connections between network nodes sharing a virtual area, comprising:
   storing a virtual area specification comprising a description of one or more switching rules each defining a respective connection between sources of a respective real-time data stream type and sinks of the real-time data stream type in terms of positions in the virtual area, wherein at least one of the one or more switching rules defines the respective connection between sources of a respective real-time data stream type and sinks of the real-time data stream type in terms of positions in relation to geometric elements of the virtual area; and establishing one or more real-time data stream connections between network nodes associated with respective objects each of which is associated with at least one of a source and a sink of one or more or the real-time data stream types, wherein the establishing is based on the one or more switching rules, the respective sources and sinks associated with the objects, and respective positions of the objects in the virtual area.

2. The method of claim 1, wherein:

the virtual area specification comprises a description of one or more zones in the virtual area;

the one or more switching rules associate with one or more of the zones (i) a respective real-time data stream type that is sourced from the zone and (ii) a respective one of the zones into which the respective real-time data stream type is sunk; and the establishing comprises ascertaining the positions of the first and second objects in relation to one or more of the zones, and establishing the one or more real-time data stream connections based on the ascertained positions.

3. A method of switching real-time data stream connections between network nodes sharing a virtual area, comprising:

storing a virtual area specification comprising a description of one or more switching rules each defining a respective connection between sources of a respective real-time data stream type and sinks of the real-time data stream type in terms of positions in the virtual area, wherein the virtual area specification comprises a description of one or more zones in the virtual area, and the one or more switching rules associate with one or more of the zones (i) a respective real-time data stream type that is sourced from the zone and (ii) a respective one of the zones into which the respective real-time data stream type is sunk; and establishing one or more real-time data stream connections between network nodes associated with respective objects each of which is associated with at least one of a source and a sink of one or more of the real-time data stream types, wherein the establishing is based on the one or more switching rules, the respective sources and sinks associated with the objects, and respective positions of the objects in the virtual area;

wherein the establishing comprises ascertaining the positions of the first and second objects in relation to one or more of the zones, and establishing the one or more real-time data stream connections based on the ascertained positions, identifying all the zones that are occupied by a given one of the objects, and determining a target set of real-time data stream types that the one or more switching rules associate with the identified zones.

4. The method of claim 3, wherein the establishing comprises ascertaining ones of the objects excluding the given object that are contained in one or more of the zones from which ones of the real-time data stream types in the target set are sourced and into which ones of the real-time data stream types in the target set are sunk as defined by the one or more switching rules;

determining a connectable set of real-time data streams each of which is at least one of (i) sourced from one or more of the network nodes that are associated with the ascertained objects and (ii) sunk into one or more of the network nodes that are associated with the ascertained objects; and determining a set of required real-time data stream data based on a matching of sources and sinks that are associated with the connectable set of real-time data streams.

5. The method of claim wherein at least one of the switching rules associates a respective source role identifier with a given one of the real-time data stream types, and the establishing comprises establishing one or more of the real-time data stream connections based on a comparison of the source role identifier with role identifiers respectively associated with one or more of the objects associated with sources of the given real-time data stream type.

6. The method of claim 1, wherein at least one of the switching rules associates a respective sink role identifier with a given one of the real-time data stream types, and the establishing comprises establishing one or more of the real-time data stream connections based on a comparison of the sink role identifier with role identifiers respectively associated with one or more of the objects associated with sinks of the real-time data stream type.

7. The method of claim 1, wherein the establishing additionally is based on at least one proximity policy rule that only allows connections of ones of the sources with compatible ones of the sinks that are associated with respective objects that are within a prescribed distance of each other in the virtual area.

8. A method of switching real-time data stream connections between network nodes sharing a virtual area, comprising:

storing a virtual area specification comprising a description of one or more switching rules each defining a respective connection between sources of a respective real-time data stream type and sinks of the real-time data stream type in terms of positions in the virtual area;

establishing one or more real-time data stream connections between network nodes associated with respective objects each of which is associated with at least one of a source and a sink of one or more of the real-time data stream types, wherein the establishing is based on the one or more switching rules, the respective sources and sinks associated with the objects, and respective positions of the objects in the virtual area;

maintaining an objects register, wherein the objects register comprises for each object in the virtual area a respective object identifier, connection data enabling a network connection to be established with a network node associated with the object, and interface data identifying all real-time data stream source types and sink types that respectively are associated with the object; and sending the objects register to one or more of the network nodes that are associated with objects in the virtual area.

9. The method of claim 8, further comprising:

receiving interface data from a given one of the network nodes, wherein the interface data comprises for each object associated with the given network node a list of all real-time data stream source types and real-time data stream sink types that are associated with the given network node;

updating the objects register with the interface data received from the given network node; and transmitting the updated objects register to one or more other ones of the network nodes that are associated with objects listed in the objects register.

10. A method of switching real-time data stream connections between network nodes sharing a virtual area, comprising:

storing a virtual area specification comprising a description of one or more switching rules each defining a respective connection between sources of a respective real-time data stream type and sinks of the real-time data stream type in terms of positions in the virtual area; and establishing one or more real-time data stream connections between network nodes associated with respective objects each of which is associated with at least one of a source and a sink of one or more of the real-time data stream types, wherein the establishing is based on the one or more switching rules, the respective sources and sinks associated with the objects, and respective positions of the objects in the virtual area; and determining a real-time data stream handling topology that delivers a specified set of real-time data stream data to a given one of the network nodes, wherein the virtual area specification specifies stream attribute values for one or more real-time data stream types in one or more zones of the virtual area, and the determining comprises selecting the real-time data stream handling topology based on the one or more stream attribute values specified by the virtual area specification.

11. The method of claim 10, wherein the virtual area specification assigns a first stream priority attribute value to a first real-time data stream type and assigns to a second real-time data stream type a second stream priority attribute value different from the first stream priority attribute value, and the selecting comprises selecting as the stream handling topology a topology that prioritizes the first and second real-time data stream types differently in accordance with the different first and second stream priority attribute values.

12. The method of claim 10, wherein the virtual area specification assigns a first stream topology attribute value to a first real-time data stream type and assigns to a second real-time data stream type a second stream topology attribute value different from the first stream topology attribute value, and the selecting comprises selecting different stream handling topologies for the first and second real-time data stream types in accordance with the different first and second stream topology attribute values.

13. The method of claim 12, wherein the stream handling topology selected for the first real-time data stream type delivers ones of the real-time data streams of the first type to the given network node in a mixed stream format, and the stream handling topology selected for the second real-time data stream type delivers ones of the real-time data streams of the second type to the given network node in an unmixed stream format.

14. The method of claim 1, wherein the establishing comprises creating the one or more real-time data stream connections through respective links, each of the links having a respective link bandwidth and carrying a respective transmission set of one or more real-time data streams.

15. The method of claim 14, wherein the virtual area specification assigns one or more respective bandwidth levels to each of one or more real-time data stream types, and the creating is based on the one or more bandwidth levels respectively assigned to the one or more real-time data stream types by the virtual area specification.

16. A method of switching real-time data stream connections between network nodes sharing a virtual area, comprising:

storing a virtual area specification comprising a description of one or more switching rules each defining a respective connection between sources of a respective real-time data stream type and sinks of the real-time data stream type in terms of positions in the virtual area, wherein the virtual area specification assigns one or more respective bandwidth levels to each of one or more real-time data stream types, and the virtual area specification assigns a respective minimum bandwidth level to each of one or more real-time data stream types; and, establishing one or more real-time data stream connections between network nodes associated with respective objects each of which is associated with at least one of a source and a sink of one or more of the real-time data stream types, wherein the establishing is based on the one or more switching rules, the respective sources and sinks associated with the objects, and respective positions of the objects in the virtual area, wherein the establishing comprises creating the one or more real-time data stream connections through respective links, each of the links having a respective link bandwidth and carrying a respective transmission set of one or more real-time data streams the creating is based on the one or more bandwidth levels respectively assigned to the one or more real-time data stream types by the virtual area specification, and the creating comprises determining a respective minimum link bandwidth level for each of the links based on the one or more minimum bandwidth levels respectively assigned to the one or more real-time data stream types by the virtual area specification and only creating links whose respective link bandwidth meets the determined respective minimum link bandwidth level.

17. A method of switching real-time data stream connections between network nodes sharing a virtual area, comprising:

storing a virtual area specification comprising a description of one or more switching rules each defining a respective connection between sources of a respective real-time data stream type and sinks of the real-time data stream type in terms of positions in the virtual area, wherein the virtual area specification assigns one or more respective bandwidth levels to each of one or more real-time data stream types, and the virtual area specification assigns to each of one or more real-time data stream types a respective set of multiple bandwidth levels; and establishing one or more real-time data stream connections between network nodes associated with respective objects each of which is associated with at least one of a source and a sink of one or more of the real-time data stream types, wherein the establishing is based on the one or more switching rules, the respective sources and sinks associated with the objects, and respective positions of the objects in the virtual area, wherein the establishing comprises creating the one or more real-time data stream connections through respective links, each of the links having a respective link bandwidth and carrying a respective transmission set of one or more real-time data streams the creating is based on the one or more bandwidth levels respectively assigned to the one or more real-time data stream types by the virtual area specification, and the creating comprises attempting to create a given one of the links at a first candidate link bandwidth level determined based at least in part on the bandwidth levels assigned by the virtual area specification and, in response to failure to create the given link at the first candidate link bandwidth level, trying to create the given link at a second candidate link bandwidth level determined based at least in part on the bandwidth levels assigned by the virtual area specification.

18. A method of switching real-time data stream connections between network nodes sharing a virtual area, comprising:

storing a virtual area specification comprising a description of one or more switching rules each defining a respective connection between sources of a respective real-time data stream type and sinks of the real-time data stream type in terms of positions in the virtual area, wherein the virtual area specification assigns a respective stream priority attribute value to each of one or more real-time data stream types; and establishing one or more real-time data stream connections between network nodes associated with respective objects each of which is associated with at least one of a source and a sink of one or more of the real-time data stream types, wherein the establishing is based on the one or more switching rules, the respective sources and sinks associated with the objects, and respective positions of the objects in the virtual area, wherein the establishing comprises creating the one or more real-time data stream connections through respective links, each of the links having a respective link bandwidth and carrying a respective transmission set of one or more real-time data streams, and the creating comprises, for each of the links, allocating the respective link bandwidth to the one or more real-time data streams in the respective transmission set based at least in part on the one or more stream priority attribute values respectively assigned to the one or more real-time data stream types by the virtual area specification.

19. Apparatus for switching real-time data stream connections between network nodes sharing a virtual area, comprising:

a computer readable memory operable to store a virtual area specification comprising a description of one or more switching rules each defining a respective connection between sources of a respective real-time data stream type and sinks of the real-time data stream type in terms of positions in the virtual area, wherein at least one of the one or more switching rules defines the respective connection between sources of a respective real-time data stream type and sinks of the real-time data stream type in terms of positions in relation to geometric elements of the virtual area; and a processing unit operable to establish one or more real-time data stream connections between network nodes associated with respective objects each of which is associated with at least one of a source and a sink of one or more of the real-time data stream types, wherein the processing unit establishes the one or more real-time data stream connections based on the one or more switching rules, the respective sources and sinks associated with the objects, and respective positions of the objects in the virtual area.

20. The apparatus of claim 19, wherein:

the virtual area specification comprises a description of one or more zones in the virtual area;

the one or more switching rules associate with one or more of the zones (i) a respective real-time data stream type that is sourced from the zone and (ii) a respective one of the zones into which the respective real-time data stream type is sunk; and the processing unit is operable to ascertain the positions of the first and second objects in relation to one or more of the zones and establish the one or more real-time data stream connections based on the ascertained positions.

21. Apparatus for switching real-time data stream connections between network nodes sharing a virtual area, comprising:

a computer readable memory operable to store a virtual area specification comprising a description of one or more switching rules each defining a respective connection between sources of a respective real-time data stream type and sinks of the real-time data stream type in terms of positions in the virtual area, wherein the virtual area specification comprises a description of one or more zones in the virtual area, and the one or more switching rules associate with one or more of the zones (i) a respective real-time data stream type that is sourced from the zone and (ii) a respective one of the zones into which the respective real-time data stream type is sunk; and a processing unit operable to establish one or more real-time data stream connections between network nodes associated with respective objects each of which is associated with at least one of a source and a sink of one or more of the real-time data stream types, wherein the processing unit establishes the one or more real-time data stream connections based on the one or more switching rules, the respective sources and sinks associated with the objects, and respective positions of the objects in the virtual area wherein the processing unit is operable to ascertain the positions of the first and second objects in relation to one or more of the zones and establish the one or more real-time data stream connections based on the ascertained positions, identify all the zones that are occupied by a given one of the objects;

determining a target set of real-time data stream types that the one or more switching rules associate with the identified zones, ascertain ones of the objects excluding the given object that are contained in one or more of the zones from which ones of the real-time data stream types in the target set are sourced and into which ones of the real-time data stream types in the target set are sunk as defined by the one or more switching rules, determine a connectable set of real-time data streams each of which is at least one of (i) sourced from one or more of the network nodes that are associated with the ascertained objects and (ii) sunk into one or more of the network nodes that are associated with the ascertained objects, and determine a set of required real-time data stream data based on a matching of sources and sinks that are associated with the connectable set of real-time data streams.

22. The apparatus of claim 19, wherein at least one of the switching rules associates a respective role identifier with a given one of the real-time data stream types, and the processing unit establishes one or more of the real-time data stream connections based on a comparison of the role identifier with role identifiers respectively associated with one or more of the objects associated with at least one of (i) sources of the given real-time data stream type and (ii) sinks of the given real-time data stream types.

23. A computer-implemented method of constructing a virtual area, comprising:
in response to user input, creating a model of the virtual area in a display monitor, wherein the model comprises geometric elements of the virtual area that are presented in the display monitor;
in response to user input, associating one or more switching rules with the model of the virtual area, wherein each of the switching rules defines a respective connection between sources of a respective real-time data stream type and sinks of the real-time data stream type in terms of positions in the virtual area, wherein at least one of the one or more switching rules defines the respective connection between sources of a respective real-time data stream type and sinks of the real-time data stream type in terms of positions in relation to geometric elements of the virtual area;
generating a virtual area specification describing the model of the virtual area and the one or more associated switching rules; and
storing the virtual area specification in a computer-readable storage medium.

24. A network switch for switching real-time data stream connections between network nodes sharing a virtual area, comprising:
a computer readable memory operable to store a virtual area specification comprising a description of one or more switching rules each defining a respective connection between sources of a respective real-time data stream type and sinks of the real-time data stream type in terms of positions in the virtual area, wherein at least one of the one or more switching rules defines the respective connection between sources of a respective real-time data stream type and sinks of the real-time data stream type in terms of positions in relation to geometric elements of the virtual area, and the computer readable memory additionally is operable to store a table comprising network topology information describing routes to network destinations; and
a processing unit operable to forward real-time data stream packets between network nodes each of which is associated with a respective position in the virtual area and at least one of a source and a sink of one or more of the real-time data stream types; wherein the processing unit forwards the one or more real-time data stream packets based on the network topology information and the one or more switching rules.

25. The network switch of claim 24, wherein the processing unit is operable to determine a real-time data stream handling topology that delivers a specified set of real-time data stream data to a given one of the network nodes, wherein in determining the real-time data stream handling topology the processing unit discovers the bandwidth capabilities of one or more of the given network node and the other network nodes associated with objects in the virtual area and selects the stream handling topology based on the discovered bandwidth capabilities.

26. The network switch of claim 24, wherein:
the virtual area specification comprises a description of one or more zones in the virtual area;
the one or more switching rules associate with one or more of the zones (i) a respective real-time data stream type that is sourced from the zone and (ii) a respective one of the zones into which the respective real-time data stream type is sunk; and
the processing unit is operable to perform operations comprising ascertaining the positions of the first and second objects in relation to one or more of the zones, and establishing the one or more real-time data stream connections based on the ascertained positions.

27. A network switch for switching real-time data stream connections between network nodes sharing a virtual area, comprising:
a computer readable memory operable to store a virtual area specification comprising a description of one or more switching rules each defining a respective connection between sources of a respective real-time data stream type and sinks of the real-time data stream type in terms of positions in the virtual area, wherein the virtual area specification comprises a description of one or more zones in the virtual area, the one or more switching rules associate with one or more of the zones (i) a respective real-time data stream type that is sourced from the zone and (ii) a respective one of the zones into which the respective real-time data stream type is sunk, and the computer readable memory additionally is operable to store a table comprising network topology information describing routes to network destinations; and
a processing unit operable to forward real-time data stream packets between network nodes each of which is associated with a respective position in the virtual area and at least one of a source and a sink of one or more of the real-time data stream types, wherein the processing unit forwards the one or more real-time data stream packets based on the network topology information and the one or more switching rules, wherein the processing unit is operable to perform operations comprising
ascertaining the positions of the first and second objects in relation to one or more of the zones, and establishing the one or more real-time data stream connections based on the ascertained positions,
identifying all the zones that are occupied by a given one of the objects, and
determining a target set of real-time data stream types that the one or more switching rules associate with the identified zones.

28. The network switch of claim 27, wherein the processing unit is operable to perform operations comprising:
ascertaining ones of the objects excluding the given object that are contained in one or more of the zones from which ones of the real-time data stream types in the target set are sourced and into which ones of the real-time data stream types in the target set are sunk as defined by the one or more switching rules;
determining a connectable set of real-time data streams each of which is at least one of (i) sourced from one or more of the network nodes that are associated with the ascertained objects and (ii) sunk into one or more of the network nodes that are associated with the ascertained objects; and
determining a set of required real-time data stream data based on a matching of sources and sinks that are associated with the connectable set of real-time data streams.

29. The network switch of claim 24, wherein at least one of the switching rules associates a respective source role identifier with a given one of the real-time data stream types, and the processing unit is operable to perform operations comprising establishing one or more of the real-time data stream connections based on a comparison of the source role identifier with role identifiers respectively associated with one or more of the objects associated with sources of the given real-time data stream type.

30. The network switch of claim 24, wherein at least one of the switching rules associates a respective sink role identifier with a given one of the real-time data stream types, and the processing unit is operable to perform operations comprising establishing one or more of the real-time data stream connections based on a comparison of the sink role identifier with role identifiers respectively associated with one or more of the objects associated with sinks of the real-time data stream type.

31. A network switch for switching real-time data stream connections between network nodes sharing a virtual area, comprising:
   a computer readable memory operable to store a virtual area specification comprising a description of one or more switching rules each defining a respective connection between sources of a respective real-time data stream type and sinks of the real-time data stream type in terms of positions in the virtual area, wherein the computer readable memory additionally is operable to store a table comprising network topology information describing routes to network destinations; and
   a processing unit operable to forward real-time data stream packets between network nodes each of which is associated with a respective position in the virtual area and at least one of a source and a sink of one or more of the real-time data stream types, wherein the processing unit forwards the one or more real-time data stream packets based on the network topology information and the one or more switching rules, wherein the processing unit is operable to perform operations comprising determining a real-time data stream handling topology that delivers a specified set of real-time data stream data to a given one of the network nodes, wherein the virtual area specification specifies stream attribute values for one or more real-time data stream types in one or more zones of the virtual area, and the determining comprises selecting the real-time data stream handling topology based on the one or more stream attribute values specified by the virtual area specification.

32. The network switch of claim 31, wherein the virtual area specification assigns a first stream priority attribute value to a first real-time data stream type and assigns to a second real-time data stream type a second stream priority attribute value different from the first stream priority attribute value, and in the selecting the processing unit is operable to perform operations comprising selecting as the stream handling topology a topology that prioritizes the first and second real-time data stream types differently in accordance with the different first and second stream priority attribute values.

33. The network switch of claim 31, wherein the virtual area specification assigns a first stream topology attribute value to a first real-time data stream type and assigns to a second real-time data stream type a second stream topology attribute value different from the first stream topology attribute value, and in the selecting the processing unit is operable to perform operations comprising selecting different stream handling topologies for the first and second real-time data stream types in accordance with the different first and second stream topology attribute values.

34. The network switch of claim 33, wherein the stream handling topology selected by the processing unit for the first real-time data stream type delivers ones of the real-time data streams of the first type to the given network node in a mixed stream format, and the stream handling topology selected by the processing unit for the second real-time data stream type delivers ones of the real-time data streams of the second type to the given network node in an unmixed stream format.

35. The network switch of claim 24, wherein the processing unit is operable to perform operations comprising creating the one or more real-time data stream connections through respective links, each of the links having a respective link bandwidth and carrying a respective transmission set of one or more real-time data streams.

36. The network switch of claim 35, wherein the virtual area specification assigns one or more respective bandwidth levels to each of one or more real-time data stream types, and the processing unit is operable to perform the creating based on the one or more bandwidth levels respectively assigned to the one or more real-time data stream types by the virtual area specification.

37. A network switch for switching real-time data stream connections between network nodes sharing a virtual area, comprising;
   a computer readable memory operable to store a virtual area specification comprising a description of one or more switching rules each defining a respective connection between sources of a respective real-time data stream type and sinks of the real-time data stream type in terms of positions in the virtual area, wherein the virtual area specification assigns one or more respective bandwidth levels to each of one or more real-time data stream types, the virtual area specification assigns a respective minimum bandwidth level to each of one or more real-time data stream types, and the computer readable memory additionally is operable to store a table comprising network topology information describing routes to network destinations; and
   a processing unit operable to forward real-time data stream packets between network nodes each of which is associated with a respective position in the virtual area and at least one of a source and a sink of one or more of the real-time data stream types, wherein the processing unit forwards the one or more real-time data stream packets based on the network topology information and the one or more switching rules, wherein the processing unit is operable to perform operations comprising creating the one or more real-time data stream connections through respective links, each of the links having a respective link bandwidth and carrying a respective transmission set of one or more real-time data streams, the processing unit is operable to perform the creating based on the one or more bandwidth levels respectively assigned to the one or more real-time data stream types by the virtual area specification, and in the creating the processing unit is operable to perform operations comprising determining a respective minimum link bandwidth level for each of the links based on the one or more minimum bandwidth levels respectively assigned to the one or more real-time data stream types by the virtual area specification and only creating links whose respective link bandwidth meets the determined respective minimum link bandwidth level.

38. A network switch for switching real-time data stream connections between network nodes sharing a virtual area, comprising:
   a computer readable memory operable to store a virtual area specification comprising a description of one or more switching rules each defining a respective connection between sources of a respective real-time data stream type and sinks of the real-time data stream type in terms of positions in the virtual area, wherein the virtual area specification assigns one or more respective bandwidth levels to each of one or more real-time data stream types, the virtual area specification assigns to each of one or more real-time data stream types a respective set of multiple bandwidth levels, and the computer readable memory additionally is operable to store a table comprising network topology information describing routes to network destinations; and a processing unit operable to forward real-time data stream packets between network nodes each of which is associated with a respective position in the virtual area and at least one of a source and a sink of one or more of the real-time data stream types, wherein the processing unit forwards the one or more real-time data stream packets based on the network topology information and the one or more switching rules, wherein the processing unit is operable to perform operations comprising creating the one or more real-time data stream connections through respective links, each of the links having a respective link bandwidth and carrying a respective transmission set of one or more real-time data streams the processing unit is operable to perform the creating based on the one or more bandwidth levels respectively assigned to the one or more real-time data stream types by the virtual area specification, and in the creating the processing unit is operable to perform operations comprising attempting to create a given one of the links at a first candidate link bandwidth level determined based at least in part on the bandwidth levels assigned by the virtual area specification and, in response to failure to create the given link at the first candidate link bandwidth level, trying to create the given link at a second candidate link bandwidth level determined based at least in part on the bandwidth levels assigned by the virtual area specification.

39. A network switch for switching real-time data stream connections between network nodes sharing a virtual area, comprising:

a computer readable memory operable to store a virtual area specification comprising a description of one or more switching rules each defining a respective connection between sources of a respective real-time data stream type and sinks of the real-time data stream type in terms of positions in the virtual area, wherein the virtual area specification assigns a respective stream priority attribute value to each of one or more real-time data stream types, and the computer readable memory additionally is operable to store a table comprising network topology information describing routes to network destinations; and a processing unit operable to forward real-time data stream packets between network nodes each of which is associated with a respective position in the virtual area and at least one of a source and a sink of one or more of the real-time data stream types, wherein the processing unit forwards the one or more real-time data stream packets based on the network topology information and the one or more switching rules, wherein the processing unit is operable to perform operations comprising creating the one or more real-time data stream connections through respective links, each of the links having a respective link bandwidth and carrying a respective transmission set of one or more real-time data streams, and in the creating the processing unit is operable to perform operations comprising, for each of the links, allocating the respective link bandwidth to the one or more real-time data streams in the respective transmission set based at least in part on the one or more stream priority attribute values respectively assigned to the one or more real-time data stream types by the virtual area specification.

40. A method, comprising:

receiving a virtual area specification comprising a description of one or more switching rules each defining a respective connection between sources of a respective real-time data stream type and sinks of the real-time data stream type in terms of positions in a virtual area, wherein the virtual area specification specifies stream attribute values for one or more real-lime data stream types in one or more zones of the virtual area; and determining one or more real-time data stream connections between network nodes associated with respective objects in the virtual area, wherein each of the objects is associated with at least one of a source and a sink of one or more of the real-time data stream types, and the determining is based on the one or more switching rules, the respective sources and sinks associated with the objects, and respective positions of the objects in the virtual area; and determining a real-time data stream handling topology that delivers a specified set of real-time data stream data to a given one of the network nodes, wherein the determining comprises selecting the real-time data stream handling topology based on the one or more stream attribute values specified by the virtual area specification;

wherein the receiving and the determining are performed by a computer.

41. The method of claim 40, further comprising further comprising:

from the computer to a first one of the network nodes, transmitting data for establishing the one or more real-time data stream connections between the first network node and a second one of the network nodes.

42. A method of switching real-time data stream connections between first and second network nodes respectively represented by first and second objects in a virtual area, comprising:

by the first network node, receiving from a server network node data for establishing one or more real-time data stream connections between the first network node and the second network node, wherein each of the first and second objects respectively is associated with at least one of a source and a sink of one or more of the real-time data stream types, the data received from the server network node controls switching of the one or more real-time data stream connections by the first network node in accordance with the sources and sinks respectively associated with the first and second objects in the virtual area, respective positions of the first and second objects in the virtual area, and one or more switching rules, and each of the switching rules defines a respective connection between sources of a respective one of the real-time data stream types and sinks of the respective real-time data stream type in terms of positions in the virtual area, wherein at least one of the one or more switching rules defines the respective connection between sources of a respective real-time data stream type and sinks of the real-time data stream type in terms of positions in relation to geometric elements of the virtual area; and by the first network node, establishing the one or more real-time data stream connections between the first network node and the second network node.

* * * * *

UNITED STATES PATENT AND TRADEMARK OFFICE
CERTIFICATE OF CORRECTION

PATENT NO. : 7,769,806 B2  Page 1 of 1
APPLICATION NO. : 11/923629
DATED : August 3, 2010
INVENTOR(S) : Van Wie et al.

It is certified that error appears in the above-identified patent and that said Letters Patent is hereby corrected as shown below:

Front page, under Item (12), replace "Wie et al." with --Van Wie et al.--.

Column 36, line 57, between "shared" and "time" insert --communications environments described above, except that one or more of the real--.

Column 40, line 10, between "claim" and "wherein" insert --1--.

Column 42, line 62, between "streams" and "the" insert --,--.

Column 49, line 21, between "streams" and "the" insert --,--.

Column 50, line 11, replace "real-lime" with --real-time--.

Column 50, line 12, delete "and".

Signed and Sealed this

Seventh Day of December, 2010

David J. Kappos
*Director of the United States Patent and Trademark Office*